United States Patent [19]
Schmonsees

[11] Patent Number: 5,890,149
[45] Date of Patent: Mar. 30, 1999

[54] ORGANIZATION TRAINING, COACHING AND INDEXING SYSTEM

[75] Inventor: Robert J. Schmonsees, Potomac, Md.

[73] Assignee: WisdomWare, Inc., Falls Church, Va.

[21] Appl. No.: 667,803

[22] Filed: Jun. 20, 1996

[51] Int. Cl.$^6$ ..................................................... G06F 6/00
[52] U.S. Cl. ..................................................... 707/3; 707/1
[58] Field of Search ........................................ 707/1–206

[56] References Cited

U.S. PATENT DOCUMENTS

| | | |
|---|---|---|
| 4,441,160 | 4/1984 | Azcua et al. . |
| 4,503,503 | 3/1985 | Suzuki . |
| 4,541,056 | 9/1985 | Matthews . |
| 4,853,852 | 8/1989 | Rosen . |
| 5,210,868 | 5/1993 | Shimada et al. .......................... 707/104 |
| 5,241,671 | 8/1993 | Reed et al. . |
| 5,247,437 | 9/1993 | Vale et al. . |
| 5,283,862 | 2/1994 | Lund . |
| 5,283,865 | 2/1994 | Johnson . |
| 5,303,042 | 4/1994 | Lewis et al. . |
| 5,309,355 | 5/1994 | Lockwood . |
| 5,321,605 | 6/1994 | Chapman et al. . |
| 5,327,341 | 7/1994 | Whalen et al. . |
| 5,331,544 | 7/1994 | Lu et al. . |
| 5,367,452 | 11/1994 | Gallery et al. . |
| 5,367,627 | 11/1994 | Johnson . |
| 5,377,095 | 12/1994 | Maeda et al. . |
| 5,442,778 | 8/1995 | Pedersen et al. . |
| 5,459,861 | 10/1995 | Oda . |
| 5,475,833 | 12/1995 | Dauerer et al. . |
| 5,483,651 | 1/1996 | Adams et al. . |
| 5,487,132 | 1/1996 | Cheng . |
| 5,493,490 | 2/1996 | Johnson ..................................... 705/26 |
| 5,493,658 | 2/1996 | Chiang et al. . |
| 5,623,660 | 4/1997 | Josephson ..................................... 707/9 |

*Primary Examiner*—Thomas G. Black
*Assistant Examiner*—John G. Mills, III
*Attorney, Agent, or Firm*—Nixon & Vanderhye P.C.

[57] ABSTRACT

A device and method for accumulating, storing, and accessing information collectively held by a corporation of people is disclosed. The information is categorized into core subjects having many linked secondary topics having many linked tertiary details. The information also includes pointers and links to information stored elsewhere, for example the Internet. The information is stored as objects containing an answer to an inquiry, the associated links, and actions to be taken. The objects acts as navigational aids to the user without dictating the user's navigation through the information. The invention includes a feedback system that encourages users to provide their reactions to information on the system. Thus, over time, the system will accumulate the best information available to a corporation in the collective knowledge of its employees.

17 Claims, 17 Drawing Sheets

HIGH IMPACT KNOWLEDGE
<u>30</u>

ARCHITECTURE <u>40</u>
- LEVEL 1 - SUBJECT IDENTIFIER ATTRIBUTES
- LEVEL 2 - TOPIC ATTRIBUTES
- LEVEL 3 - DETAIL ATTRIBUTES

CORE SUBJECTS <u>41</u>
- OUR CUSTOMERS NEEDS
- OUR PRODUCTS AND SERVICES
- OUR COMPETITORS PRODUCTS AND SERVICES

ADDITIONAL SUBJECTS (OPTIONAL)
- OUR COMPANY
- OUR COMPETITORS
- OUR PROCESSES
- OTHERS

*FIG. 4*

ORGANIZATION TRAINING, COACHING AND INDEXING SYSTEM

The present invention relates to an employee training and coaching system for an organization which also serves as an index and intelligent link to digitized and non-digitized information. In particular, it relates to a system of collecting and disseminating the collective knowledge of a group of people, such as corporate employees.

BACKGROUND OF THE INVENTION

In an information based economy, effectively training employees and leveraging and managing the "knowledge assets" of an organization can be critical to the success of that organization. While some of an organization's knowledge assets are clearly documented (i.e. product specifications, patents, customer lists, policies & procedures, etc.), a great deal of the important knowledge, (i.e., the answers to questions regarding product and marketing strategies, reasons why customers buy, descriptions of best practices, new developments of all types, who to call, where to find certain information, etc.) that makes the organization function and thrive, is only contained in the minds of specific employees. This knowledge is generically referred to herein as "High Impact Knowledge." The availability of the High Impact Knowledge, which is often fluid and in a state of flux, to the appropriate employee at just the right time, can have a significant impact on the performance of the entire organization (i.e., a major sale could be lost because the sales person did not know how to identify a prospect's particular need). A key challenge for management, therefore, is to provide systems and facilities that support the efficient and effective transfer of information and knowledge, especially the High Impact Knowledge which is available generally in the minds of certain employees to the company's employees as a whole. In this way, the overall productivity of the company is increased and the knowledge assets of the organization are disbursed and expanded.

Several major issues make this challenge difficult.

For example, knowledge transfer is inherently chaotic. It can originate and be required from anywhere, by anybody, at anytime, and in any form. Coordinating the transfer of knowledge from one employee to another thus requires some process for causing the proper employees to interact at the proper time.

There is a continuing explosion in the volume of information available as well as in the volume of information sources. While availability of information can initially be regarded as a good opportunity, the opportunity is lost if the volume of information expands beyond that which the organization's employees can realistically wade through. Thus, as information sources increase, the likelihood of any one source being used decreases.

The velocity of change also effects both the currency and validity of the knowledge. To be effective, somehow the information source must anticipate changes in its information content, identify how the information has changed, identify who (or what) has the best new information to make the change; and identify how the change effects other information in other sources. This task alone is generally prohibitive, causing information in a source to "fall behind" and become no longer useful.

Finally, the importance of a specific piece of knowledge depends on a situation. Preconceived determinations about which information content will receive the most attention in preparation, updating, etc., involves a value judgment that may be appropriate in one situation but be wrong in another.

In dealing with this challenge, organizations have implemented comprehensive employee training programs that educate employees about important areas of the organization's business and purpose. Organization's also have attempted to improve communication between employees by installing technology-based communication vehicles such as phone-mail, e-mail, and video-conferencing. Many have also implemented "Computer Based Content Systems" which provide employees with:

Tools for on-line research,

Computer Based Training, and

Expert assistance in performing complex tasks.

Current implementations of computer based content systems can be classified into one of two categories.

Expert, and

Self-Directed

Expert content systems are used both to train employees in a specialized skill (e.g., computer based training), and to assist employees in performing complex tasks. An expert content-based system typically has a pre established system objective and is characterized by the "expertise" or control over the training exercise residing in the system, i.e., the exercise is heavily "system directed." In these systems, a user typically begins the exercise by selecting a specific topic, answering a posed question, the answer to which leads to another question, which leads to another question, etc. taking the user deeper and deeper into the Topic.

A classic example of an expert system is in the context of assisting physician diagnoses. A physician, for example, faced with a set of symptoms unfamiliar to the physician poses the problem to the expert system for assistance. The expert system may direct the exercise by first asking for the doctor to characterize the ailment by asking "is the patient experiencing pain?" The doctor answers "yes." The expert system poses the next question, such as "where?", and offers a set of answers. The expert system then continues with the questions and answers until reaching some conclusion which is displayed to the physician.

The expert system, because of the goal it is seeking, and the fact that its questions are directed by answers given, is framed in a hierarchial format of questions and answers

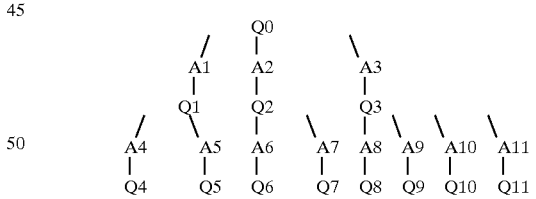

The system starts with Question 0 and expects to receive either Answers 1, 2, or 3. Depending on the answer given, the system poses Question 1, 2, or 3, and so on until a conclusion is reached. A user would not go from Q8 for example to A1 because the expert system's objective is to keep directing the user to an end result within the same logic path or hierarchy.

Another example of an expert system is in the context of helping sales people configure complex products and generate proposals for prospects. An example of this system is described in U.S. Pat. No. 5,493,490.

Expert Systems are characterized by the following:

They typically involve a highly specialized knowledge or information base.

They are designed for a specific user profile (i.e., a customer support person, doctors, technicians, etc.).

They are procedural in nature and have an established objective for each session.

They are best suited for precise, binary information (i.e., Right or Wrong).

They produce a consistent usage pattern.

They require considerable user interaction.

They may employ "Rules Based Inferencing Software".

Knowledge flow is in one direction . . . from the system to the user.

The Expert Systems have limitations. They provide little, if any, ad hoc navigation capability for the user. That is, the expert system, by its nature directs the flow of the information and makes it difficult, if not impossible for the user to deviate to new sources of information or a different path of questioning without ending the session and going back to the beginning of the system. They also require specialists to create, and can be costly to maintain. As such, they are best applied to knowledge that remains relatively stagnant. Further, they support a limited set of users and those users must be committed to using the system because of the length of user sessions.

With advancements in "Text Retrieval" and "Hypertext" technology, and the popularity of the INTERNET and World Wide Web, self-directed content systems have begun to be implemented within organizations to provide wide user access to information that was previously stored only on documents and other forms of un-digitized mediums. These systems may be called IntraNets or Marketing Encyclopedia Systems, and they provide unrestricted browsing of document based information such as:

Policies & Procedures Manuals

Sales and Marketing Literature

Competitive Analysis

Sales Manuals

Price Lists

Product Presentations

Self-directed content systems are characterized by the following:

They apply to a wide user audience

Their usage pattern is random

They allow for unrestricted browsing by the user

They support a wide range of content (topics, format, precision)

They support huge volumes of information

All information carries the same importance. It is all just data to the navigation system, the user decides the value.

The information flow is typically one way.

Self-directed content systems also have limitations. Their navigation capabilities are restricted, and the information is presented in large blocks like a document or video clip. That is, the user plots and plans (or stumbles around) a path through these large blocks of information. Because of the vast volume of information, users find it difficult to find specific information and easily get lost. When they can find the information they need, the information can be inconsistent between different sources on the system. While it is easy to put documents into such a system, the appropriate design architecture and maintenance procedures are complicated. These systems are also difficult to customize for a particular type of user.

While both Expert and Self-Directed approaches are effective in supporting certain functions, neither is truly effective in either the creation or consolidation and dissemination of High Impact Knowledge, or it's timely transfer among a wide employee audience. Even though High Impact Knowledge can be organized and categorized, it's wide scope, random usage pattern, and volatile nature make it ill suited for the Expert System approach. On the other hand, while High Impact Knowledge may be contained in some of the documents in a Self Directed System, like a Marketing Encyclopedia System or IntraNet, it is often difficult for users to locate because it is not easily identified as High Impact Knowledge, and is often buried among all the other information.

SUMMARY OF THE INVENTION

For the purposes of this specification the following definitions apply:

High Impact Knowledge: Information regarding an organization's products and services, its' competitor's products and services, and the customer needs that those products and services satisfy. This knowledge is generally used by employees of that organization to promote the sale of its' products and services to customers.

Best Answer: A concise (preferably one sentence) response to a particular aspect of High Impact Knowledge which has undergone feedback and review by company employees such that the response is or approaches an ideal response from the collective knowledge of the employees.

High Impact Knowledge Object: A logical unit of data in a database which includes one Best Answer plus additional data which may include links to other High Impact Objects in the database as well as links and Pointers to other information not in the database which may or may not be in digital or electronic format.

Pointers: Pointers describe the location of information which may or may not be stored electronically. These locations include the following:
1. Digital information in the data base of the invention
2. Digital information in other data bases controlled by the organization that employs the invention
3. Digital information in data bases not controlled by the organization that employs the invention
4. Non Digital Information in any format like books, printed manuals, video tapes that may be stored anywhere, both within and without locations controlled by the organization.

Links: Links are electronic connections to:
1. Digital information in the data base of the invention
2. Digital information in other data bases controlled by the organization that employs the invention
3. Digital information in data bases not controlled by the organization that employs the invention The invention described herein represents a new form of computer based content management system that specifically is designed to effectively organize and manage an organization's High Impact Knowledge, and serve as an intelligent index and linking facility to an organization's on-line documents and other information as well as information stored outside the organization, for example on the Internet or an online service such as America On-line or CompuServe. The invention increases the value of an organization's knowledge assets and improves the productivity of its' employees, especially those in sales and marketing.

The proposed invention solves the above-problems by creating a "Hybrid Content System" that has aspects of both expert-based and self-directed systems. It is a self contained, integrated computer-based workflow system specifically designed for capturing High Impact Knowledge in a form called Best Answers, and delivering it to employees, most importantly, sales people, on a just-in-time basis. The invention operates on commercially available hardware, such as a PC computer, and employs several novel utilities.

First, the invention employs a special object oriented data model for the Best Answers, where each logical High Impact Knowledge Object contains a specific Best Answer, along with other information including linkages to other objects in the database as well as linkages and pointers to information located elsewhere. Thus, when a user is directed to an object, the user receives the Best Answers and links to related information.

Also included is an interactive "Authoring Facility" that assists authors of the system in developing and inputting Best Answers and adding links and pointers to Best Answers from the collective knowledge of an organization.

Then, the present invention provides a "User Navigation Facility" with a unique screen design that assists the user in navigating through the Best Answers contained in the system and accessing information outside of the system such as other systems in the organization, the Internet, and other outside information that has been linked to the High Impact Knowledge Objects. This facility permits the user to rapidly retrieve the appropriate Best Answers to a user's questions. The navigation system also includes a novel feedback system designed specifically to facilitate the collection of additional knowledge over a large number of corporate employees and to continuously improve and refine the knowledge contained in the system.

A "Systems Administration Facility" is included for adding object types to the data model, managing feedback, and performing various systems management tasks such as system synchronization, usage monitoring, maintaining user profiles and security tables, etc.

Finally, preferred embodiments of the invention include a "Reporting Facility" for producing printed reports.

BRIEF DESCRIPTION OF THE DRAWINGS

The purpose and advantages gained by the present invention will be understood by careful study of the following detailed description of the presently preferred embodiment with particular reference to the accompanying drawings.

FIG. 4 is an example embodiment of the logical architecture of the high impact knowledge objects from FIG. 3;

DETAILED DESCRIPTION OF THE PRESENTLY PREFERRED EMBODIMENT

Figure 1:
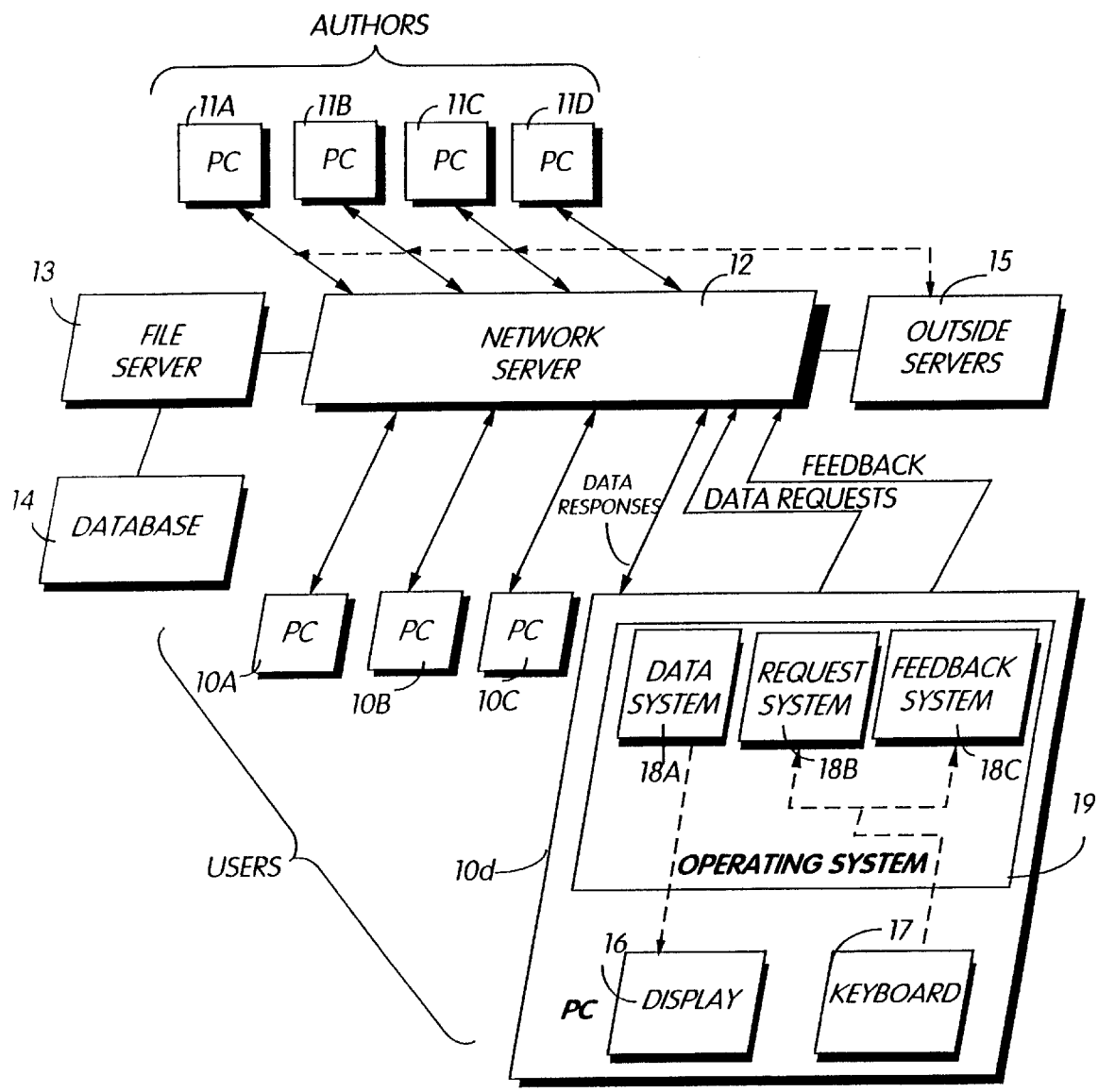
FIG. 1 is a schematic diagram of one example embodiment of the present invention in the form of a system.

FIG. 1 illustrates system hardware used by an example embodiment of the present invention. As can be seen in FIG. 1, the system is centered around a network server 12, which provides general networking capabilities for the various other components shown in FIG. 1. In particular, a certain number of PCs 10A–10D are connected to communicate with the network server 12, and are provided for company users (employees, for example) to access information through the network server 12. In addition, the PCs 11A–11D also communicate with the network server 12 and are available for so-called "authors" of the database information.

The PCs 10A–10D are restricted use PCs, permitting the users to access information from the network server 12, but which prevent the users from directly modifying the information contained in the database. Author PCs 11A–11D differ from the user PC's 10A–10D in that the author PCs include software that permits the authors to make modifications to the database information as described below.

In addition to the network server 12, the system hardware used in accordance with this embodiment of the present invention includes a file server 13 that manages files on the network and a database storage 14 that may be included as part of the file server 13 or may be a separate component communicating with the file server 13. As an optional component, the network system as well as authors or users can have the capability to connect to another network or other outside server 15 which house information, such as an intranet or an internet. The PC's 11A–D can connect the outside server 15 either directly or through a network server 12.

The user PC 10D is shown in FIG. 1 in an expanded schematic diagram to illustrate the various components included within each of the PCs 10A–10D. A customary display 16 and keyboard 17 are included, together with any pointing device that may be necessary for operation. The software systems running on the PC 10D include a data display system 18A, a request system 18B, and a feedback system 18C, all running within a commercially available operating system 19.

The request system 18B is used by the operating system 19 to request data from the network, that is contained in either the database 14 or on another network, server or i.e., the outside servers 15. A user who is operating the PCs 10A–10D typically makes a request for data by entering the request on the keyboard 17 or by clicking on a spot on the display 16, indicating to the network server 12 the type of information requested by the particular user. The network server 12 ultimately receives (from the database, from another PC, or server or from the server) the data information requested and sends via the "data responses" line, an answer to the inquiry. The data display system 18A of the PC 10D accepts the data response from the network server 12, processes it into a usable format, and displays it on the display 16.

The user, having reviewed the information received in response to the data request, then has an opportunity to provide feedback with respect to the information retrieved. For example, a user who requests information regarding the disadvantages of a competitor's product may receive data regarding a purported disadvantage that the user perceives to be less of a disadvantage than the information retrieval makes it out to be. In that instance, the user can use the feedback system 18C to record the user's reaction to the information retrieved, which information is then fed to the network server 12 and ultimately to the author PCs 11A–11D. Authors then retrieve the feedback from the PCs 11A–11D and make decisions altering, removing, or adding to the information contained in the database.

Also, PCs 11A–11D include the same types of systems shown in PC 10D, except that the feedback system is transmitted from user PCs 10A–10D and is received at PCs 11A–11D. Author PCs 11A–11D, unlike user PCs 10A–10D, include an authoring utility that permits the authors to modify the database as described in greater detail below.

Figure 2:
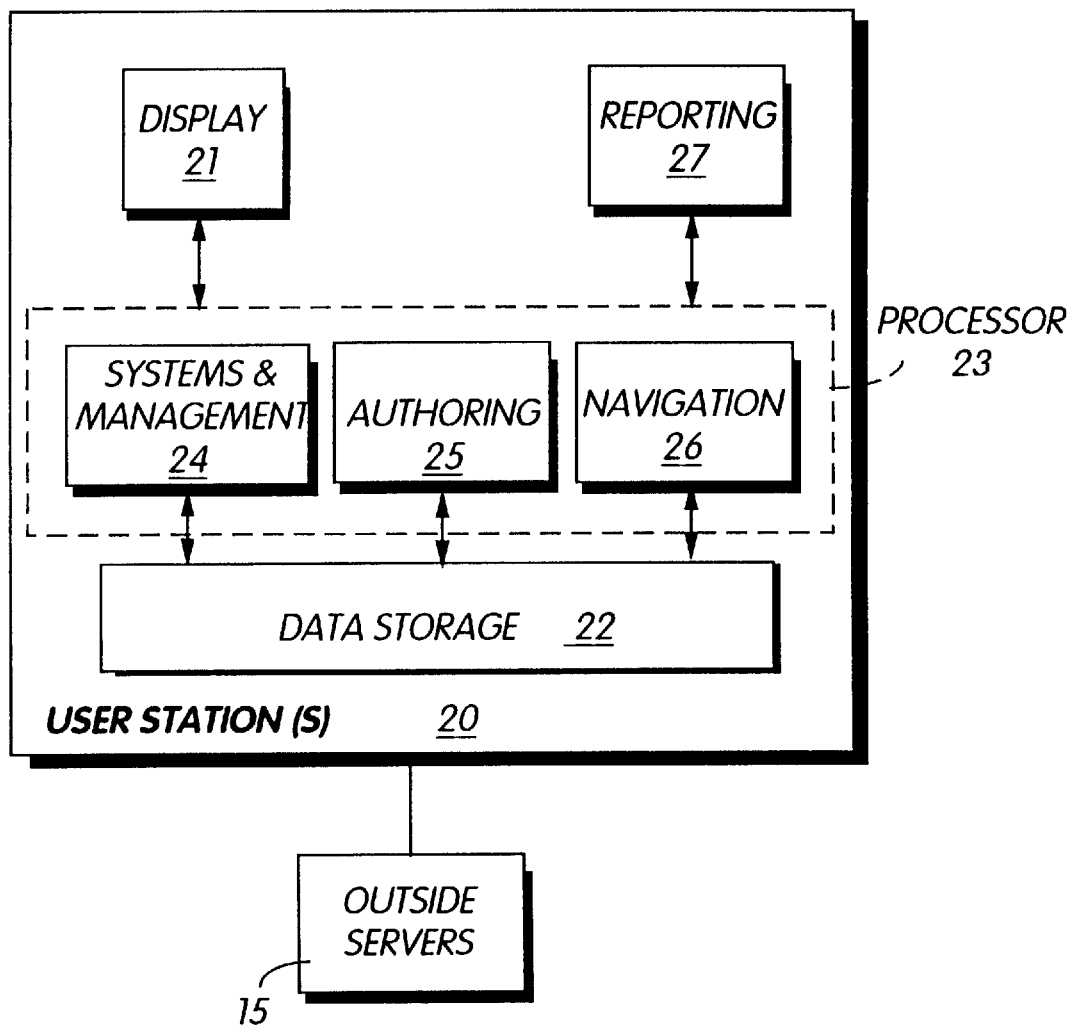
FIG. 2 is a schematic diagram of example software and hardware components of a user station in accordance with either the system of FIG. 1 or a stand-alone embodiment of the present invention.

In FIG. 2, user station 20 is shown as a single, stand-alone unit incorporating all of the various software functions. The user station 20, as depicted in FIG. 2, includes the database in the data storage 22, an author system 25 and a user system (navigation system 26). Access the certain utilities such as the authoring system can be restricted for the users (as opposed to the authors) by means of a password or some other technique. Alternatively, the station 20 can be separated into independent "author" stations and "user" stations on a network, as depicted in FIG. 1. The user station in FIG. 2 has a keyboard 17 and a pointing device for inputting data and retrieving data from the Data storage 22 and a reporting system 27 for preparing and printing/displaying reports.

Figure 3:
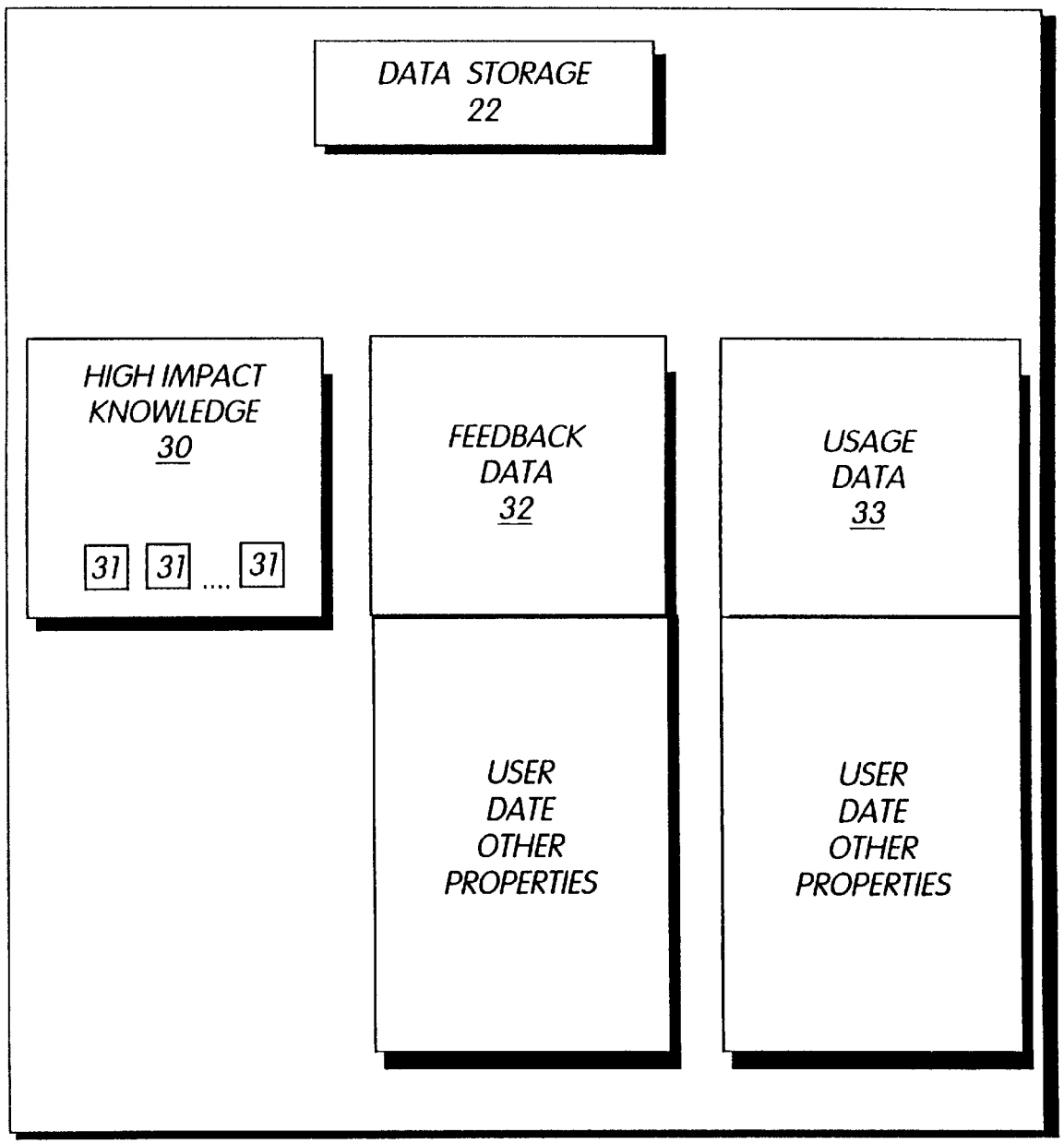
FIG. 3 is a schematic diagram of the data storage component of FIG. 2.

The database in the data storage 22 is further detailed in FIG. 3. The information and data stored and managed by the invention falls into three logical categories, usage data 33, feedback data 32, and High Impact Knowledge 31.

Usage data 33 is data used by the system to manage access to the system. This data includes general "housekeeping" information such as names, locations, and access rights of users and authors. This data is automatically captured by the system and is used by the systems management process 24. The system can keep track of how users are employing the system and will track the user, the dates that the system is used and properties of the use. For example, the length of time it was used.

Feedback data 32 is created as part of the user navigation process and is used both by the system's management process 24 and by the authoring process 25. Feedback data is information entered by a user as feedback to information reviewed by the user. For example, a salesperson who learns from the system that a competitor is selling product X, can feedback information (ultimately received by at least one author) stating that the salesperson recently heard that the competitor no longer sells product X. The feedback data is stored in the database and is used by an author to update information contained therein. In order to manage the feedback, each feedback data includes which user gave the feedback, the date the feedback was given and other properties such as the type of feedback, for example, new information or corrected information.

High Impact Knowledge 30 is created and maintained by the authoring process 25 and is used by the user navigation process 26. The High Impact Knowledge 30 contains the ultimate information to be presented to a user and each piece of High Impact Knowledge is managed as a logical object called a High Impact Knowledge Object 31. A High Impact Knowledge Object 31 contains certain information together with navigational links to other information or objects relevant to the current inquiry. The logical hierarchy of High Impact Knowledge 30 is further detailed in FIG. 4 which is a rendering of the logical architecture 40 of each "subject" and it's specific content. High Impact Knowledge 30 contains information on pre-defined subjects 41 which can be further classified into "Core Subjects," and "Additional Subjects."

The present invention recognizes that every organization, whether it provides products or services, must recognize and make sure its employees understand some customer's need, satisfy the need with a product or service, and recognize how its competitors satisfy the need with their product or service. Three "core" subjects of information thus are categorized in the High Impact Knowledge 30 contained in the database (FIG. 4) as: 1) "our customer needs," 2) "our products," and 3) "our competitor's products." Each subject may be viewed as a three level information hierarchy where Level 1 is a subject identifier attribute of the Subject, and Level 2 contains predefined "Topic" Attributes which have many to one relationships with the Subjects, and Level 3 contains "Detail" Attributes which have many to one relationships with the Topic Attributes. Examples of Topic Attributes and Detail Attributes in the subjects are described in greater detail with respect to FIGS. 6–11 below. The proposed invention has three Core Subjects (needs, our products, and competitors' products). It is anticipated that some organizations may want to add additional Subjects, of which three specific examples (our company, competitive companies, and our processes) are shown in FIG. 4.

Each attribute 40 may be viewed as an Object unto itself. These objects are known as High Impact Knowledge Objects 31.

Figure 5:
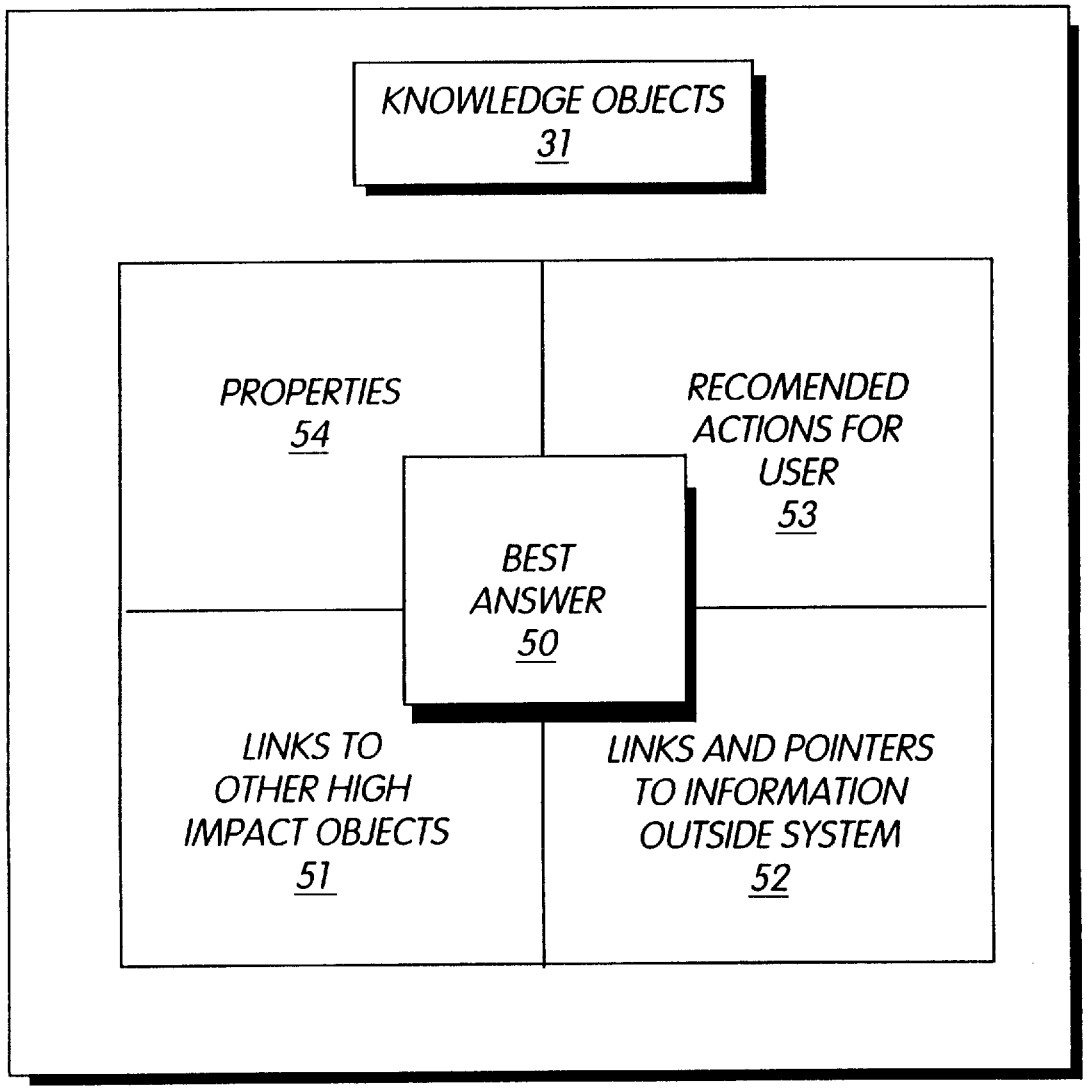
FIG. 5 is an example embodiment of a high impact knowledge object from FIG. 3.

Further detail of the logical architecture of a High Impact Knowledge Object 31 is shown in FIG. 5 which is a logical rendering of the structure of an individual High Impact Knowledge Object 31 which could be in either Level 1, Level 2, or Level 3 (element 40) for a Subject. It is possible for an Object to be an attribute for more than one Subject and also be a Subject. For example, a requirement may be under several needs and may be a need in itself. Each Object can be represented as a logical Object with five distinct components: 1) best answer 50, 2) properties 54, 3) links to other objects 51, 4) links and pointers to external information 52, and 5) recommended actions for users 53.

Best Answer 50, which can be in any digitized form (text, sound, video, graphics or any combination thereof), is a principal response to an inquiry posed by the users. For example, if an inquirer asks for a list of competitive products competing with product A, each competing product displayed would be a Best Answer 50. An important design feature of the invention is that Best Answers be as concise as possible, preferably one sentence, so as to convey to the user the specific knowledge they are looking for. Unlike most document systems where the answer may be buried in a large volume of text, the Best Answer represents a concise answer from the collective knowledge of the company's employees.

Properties 54 may describe the type, author, date of creation and other information concerning the best answer 50 in question.

Links 51 to other Objects in the invention, both within the hierarchy of the same Subject and to other Subjects or Topics, are established through the Authoring Process. Links are based on the context of the Best Answer 50 and are created through two processes, automatic and manual.

The automatic links are created automatically by the system and are within the same Subject hierarchy. These are built by the invention as the author enters information.

Manual links are specifically set by the author to link to other objects that are not in the same Subject hierarchy. In the example above regarding the engineer's request for competitors to product A, the links 51 could include a link to individual customer needs satisfied by product A; links to specific features of product A; etc. The first example link would be found in the "our customer needs" Subject (FIG. 4) while the second example link would be found in the "our products and services" Subject (FIG. 4). These links 51 are attached to the Answer 50 by the author and can be improved over time as a result of feedback received from the users.

Links and Pointers 52 to external information contained outside of the system may be contained in electronic and non-electronic mediums, within or outside of the organization that is using the invention. For example, the linkage may point to information stored in a local computer that is connected to the organization's network or may point to an internet web page of a competitor company or may point to a physical location such as a library. The benefit of this is that the author, being an expert has already researched this outside data and by linking an object to the most appropriate information outside of the system, the author has reduced much of the research that users may want to do by pre-identifying and linking the outside information. The links are an important component of the invention since they allow it to be used not just as a training tool, but also as an intelligent indexing and linking tool for all the knowledge that an organization possess, whether or not the information is contained in facilities controlled by that organization. The pre-established links give the system modified expertise to direct the user's actions, but not so much expertise as to stifle the user's ability to self-direct the inquiries.

Recommended Actions for Users 53 is a set of actions (qualifying questions for example) that a user can take that are related to the Best Answer 50. The actions 53 are specifically related to assisting employees, such as sales people, in performing their jobs.

Every Knowledge Object 31 thus includes a specific piece of company knowledge 50 together with navigational aids (51–52) that the user selects to delve deeper into the subject matter of the Answer 50. In this sense, each Object is systems directed (because the system provides the next most relevant links (51–52) for additional information), yet is also user-directed (because the user may not follow those links and instead select where and how far navigation proceeds into a particular subject matter or go to a different subject that is not linked).

Figure 7:
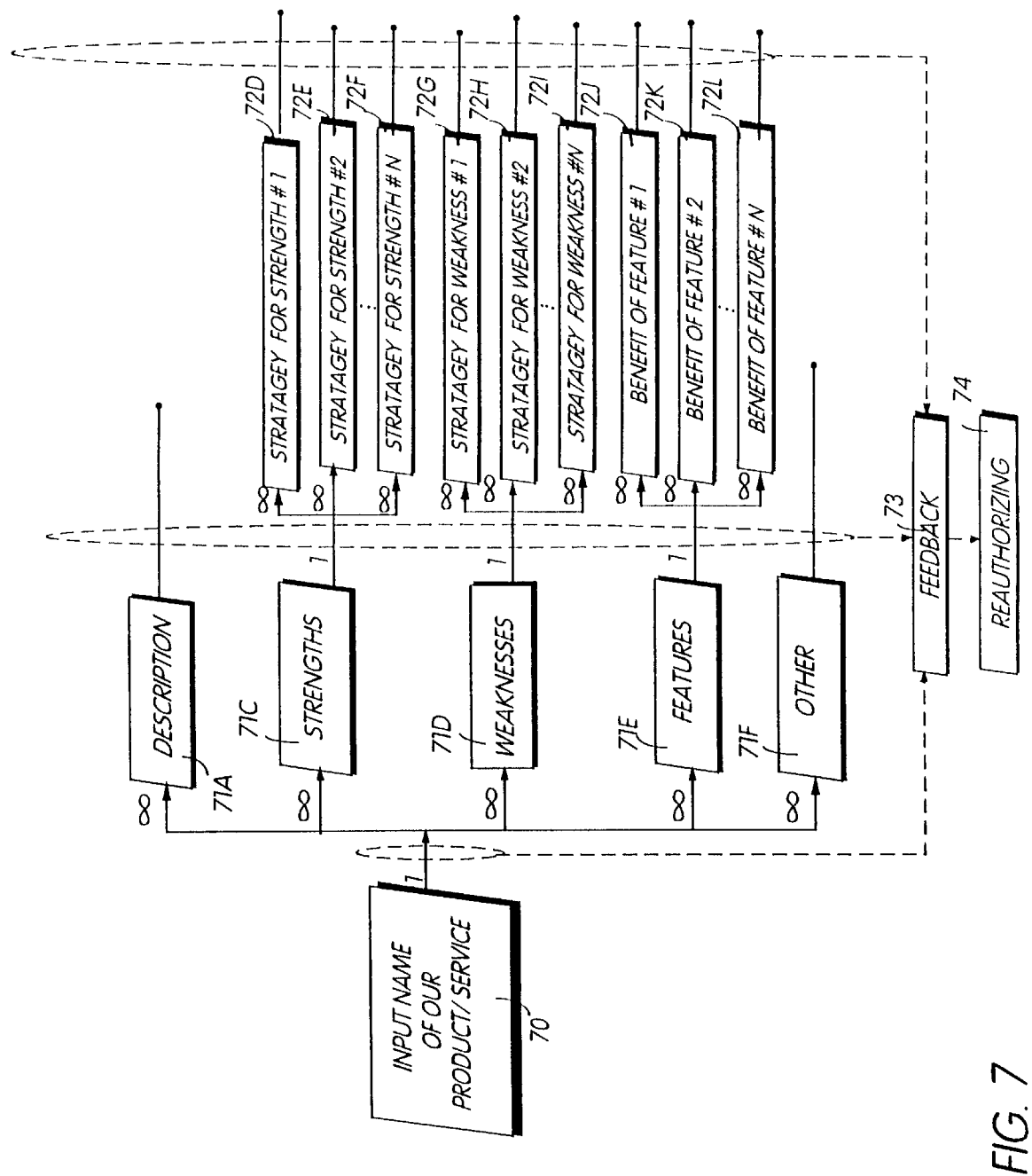
Figure 8:
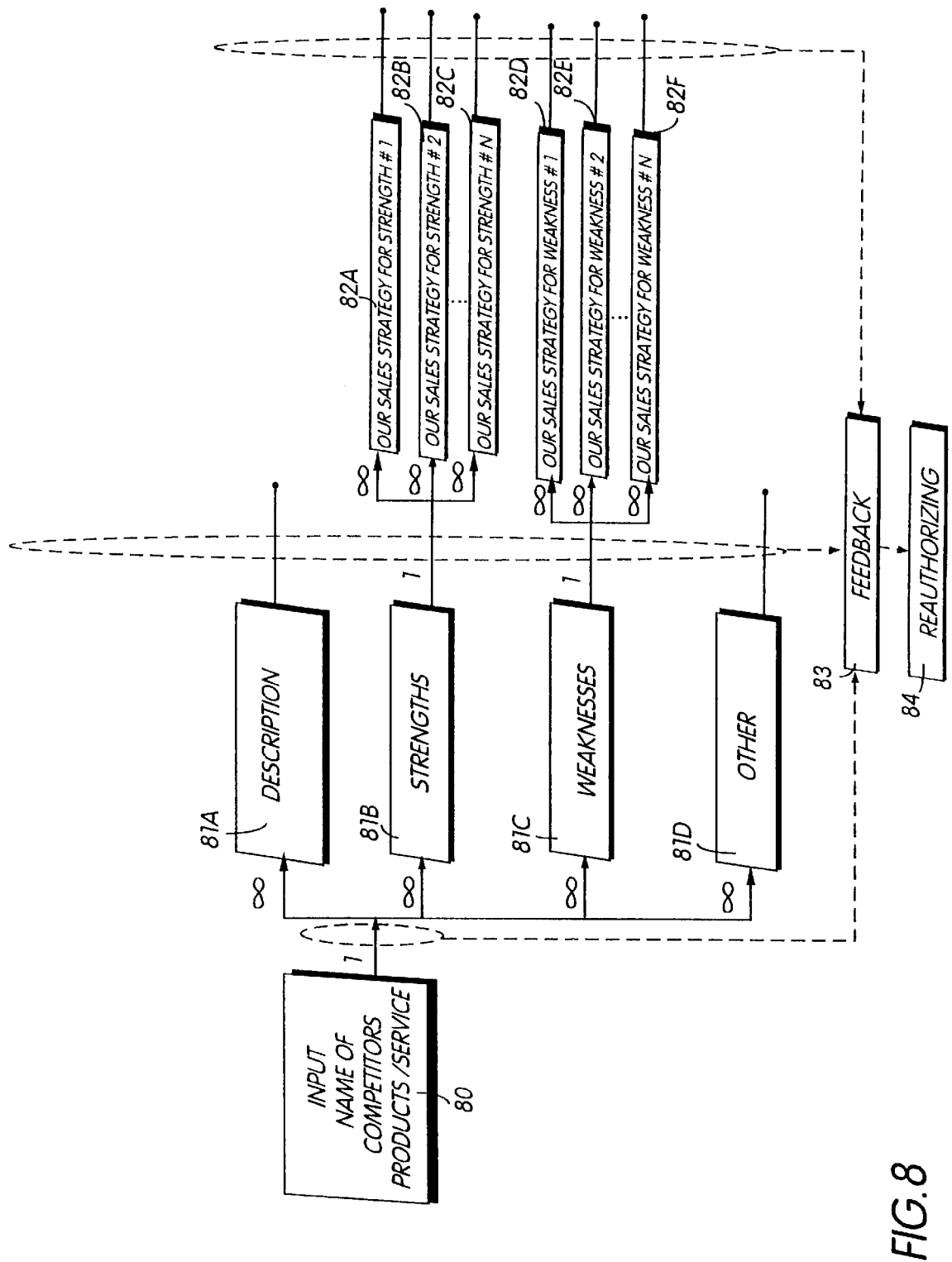
Figure 9:
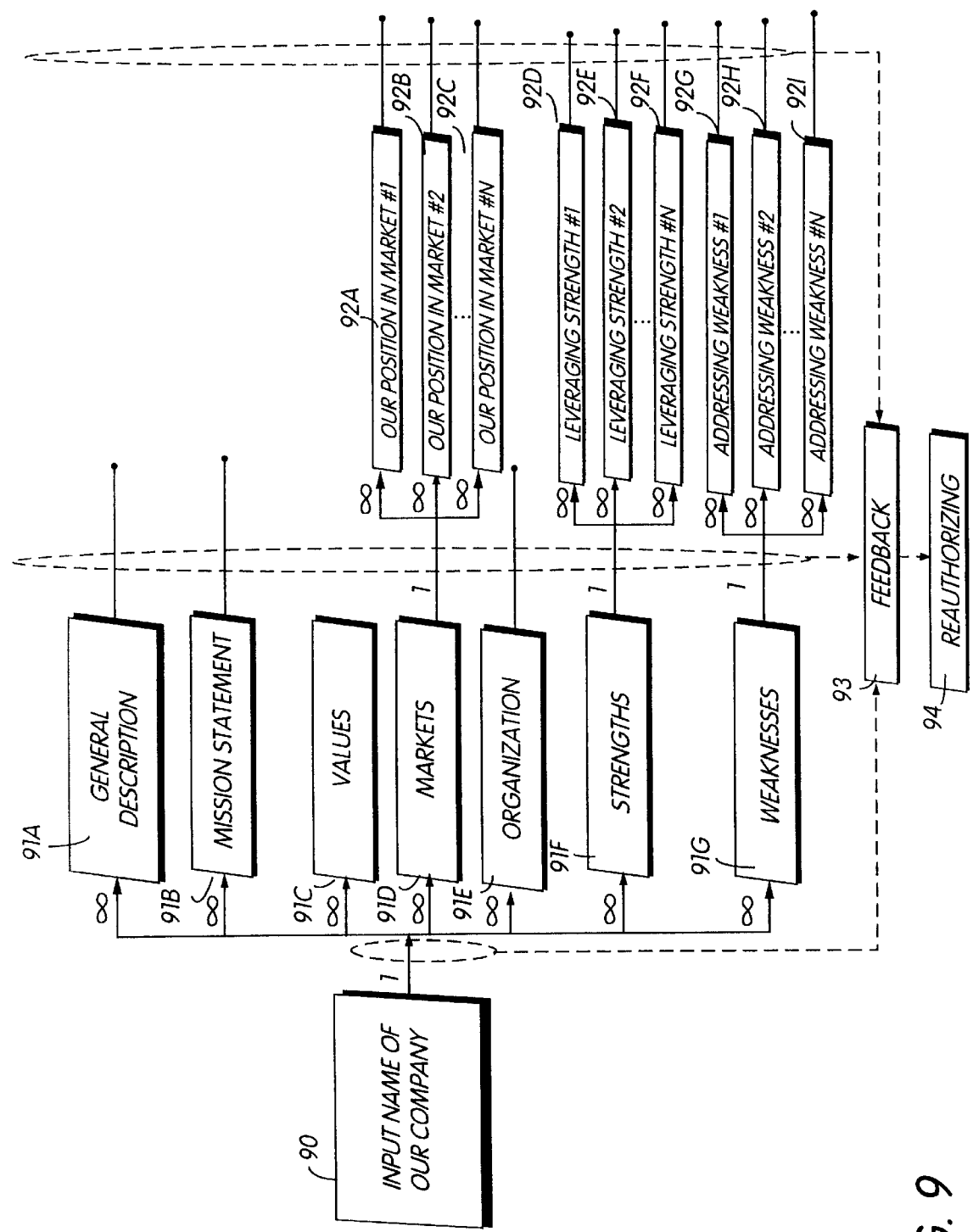
Figure 10:
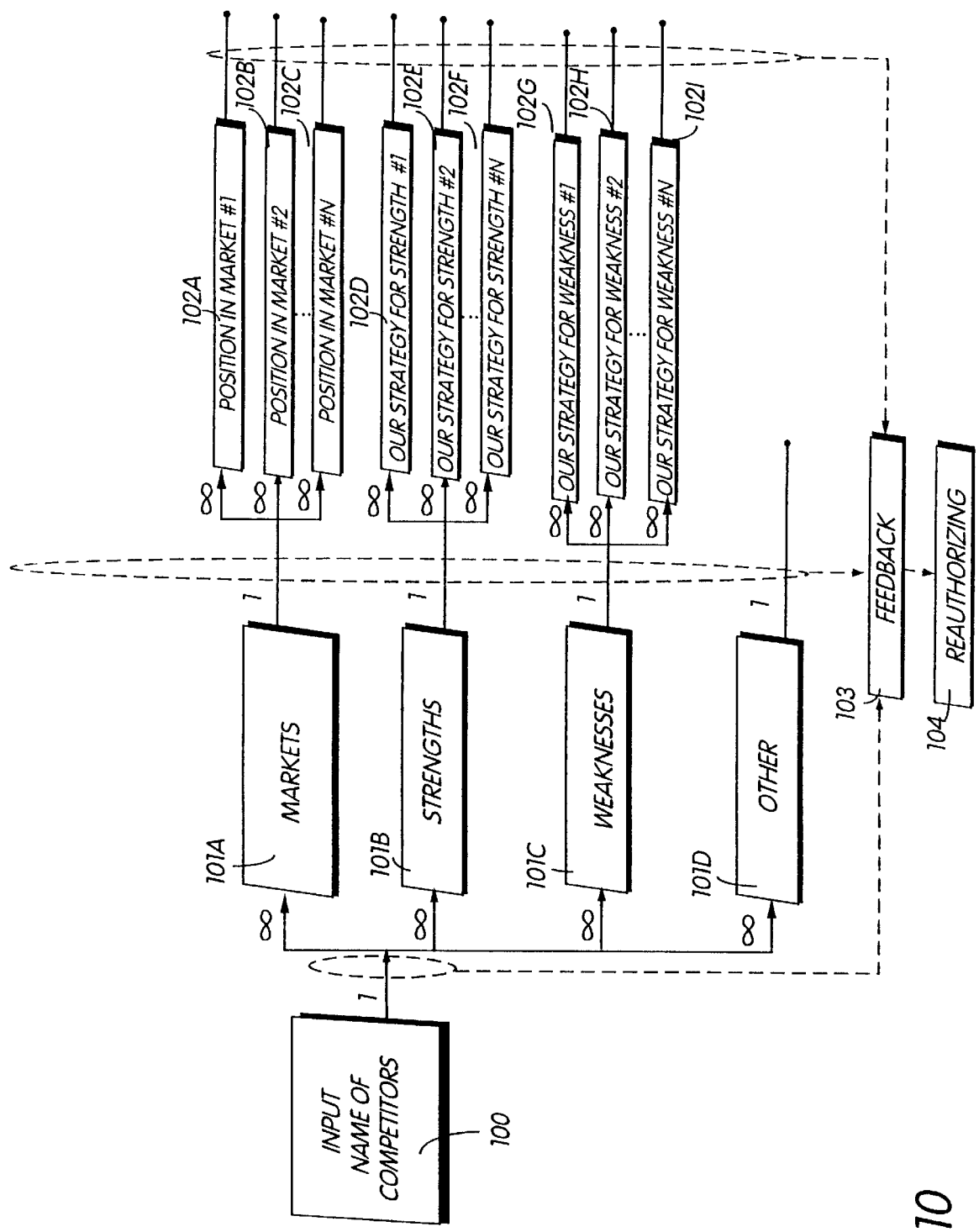
Figure 11:
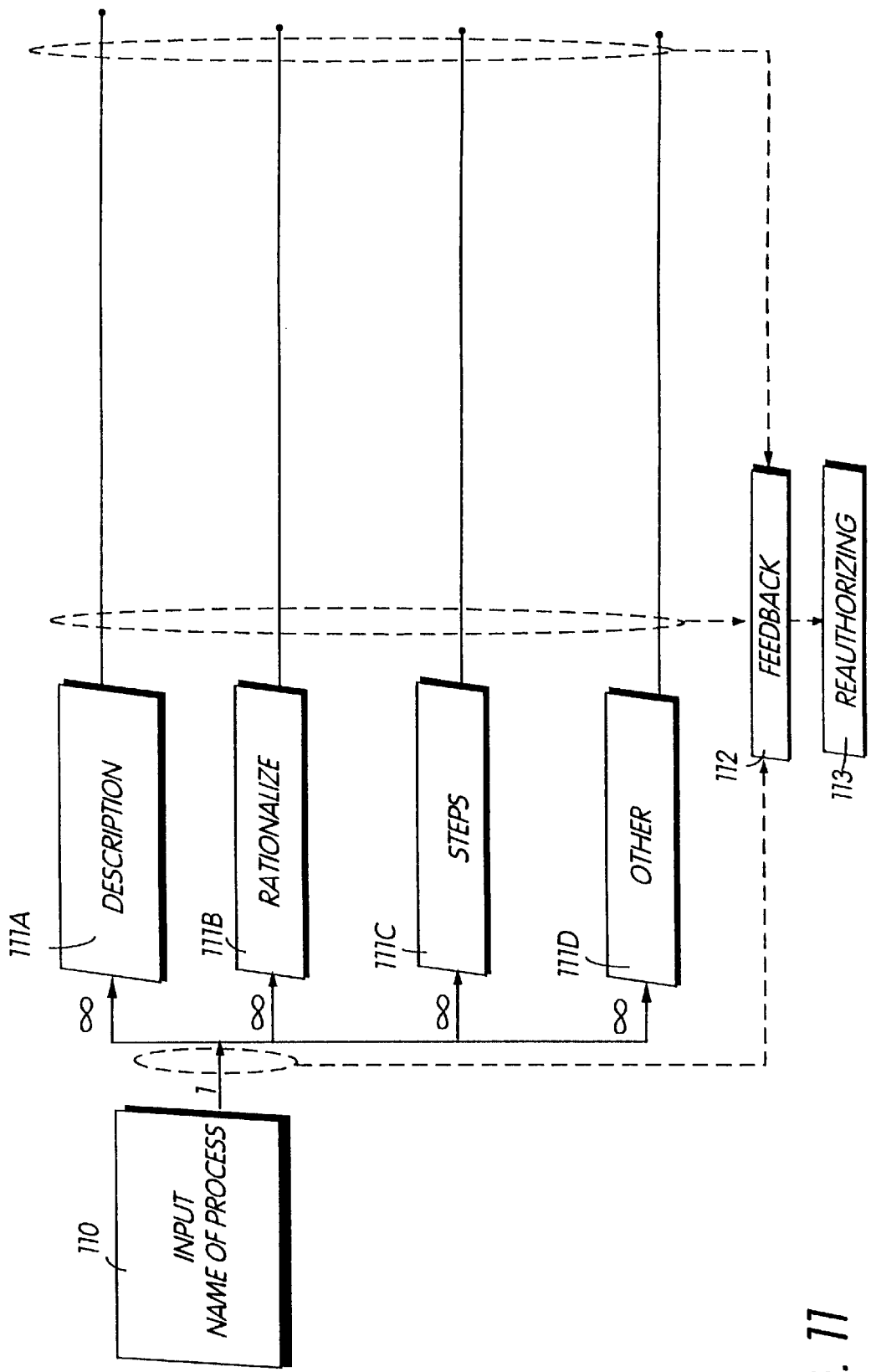

FIGS. 6–11 show an example of the database framework for the three "Core Subjects" (FIGS. 6–8) and some recommended "Additional Subjects" (FIGS. 9–11). The database is organized according to traditional database design techniques using a commercial database product, such as "Oracle," "Sybase," "Access," etc. It is also anticipated that advancements in HTML will support the Knowledge model used by the invention.

The three columns in FIGS. 6–11 represent the three hierarchial levels of attributes and information of a Particular Subject described above. On the left is the subject attribute (Level 1), followed by the Topic attributes (Level 2) and the Details attributes (Level 3). As shown in FIGS. 6–11, every Topic may have a many to one relationship with a Subject, and every Detail may have a many to one relationship with a Topic. The Topics and Details in Levels 2 and 3 can be in any form which best creates the Best Answer 50, (such as "who are the key people responsible for solving this?"), some other combinations of words or abbreviated labels (such as "Key People"), or some other type of stimuli (such as a picture or a sound).

Figure 6:
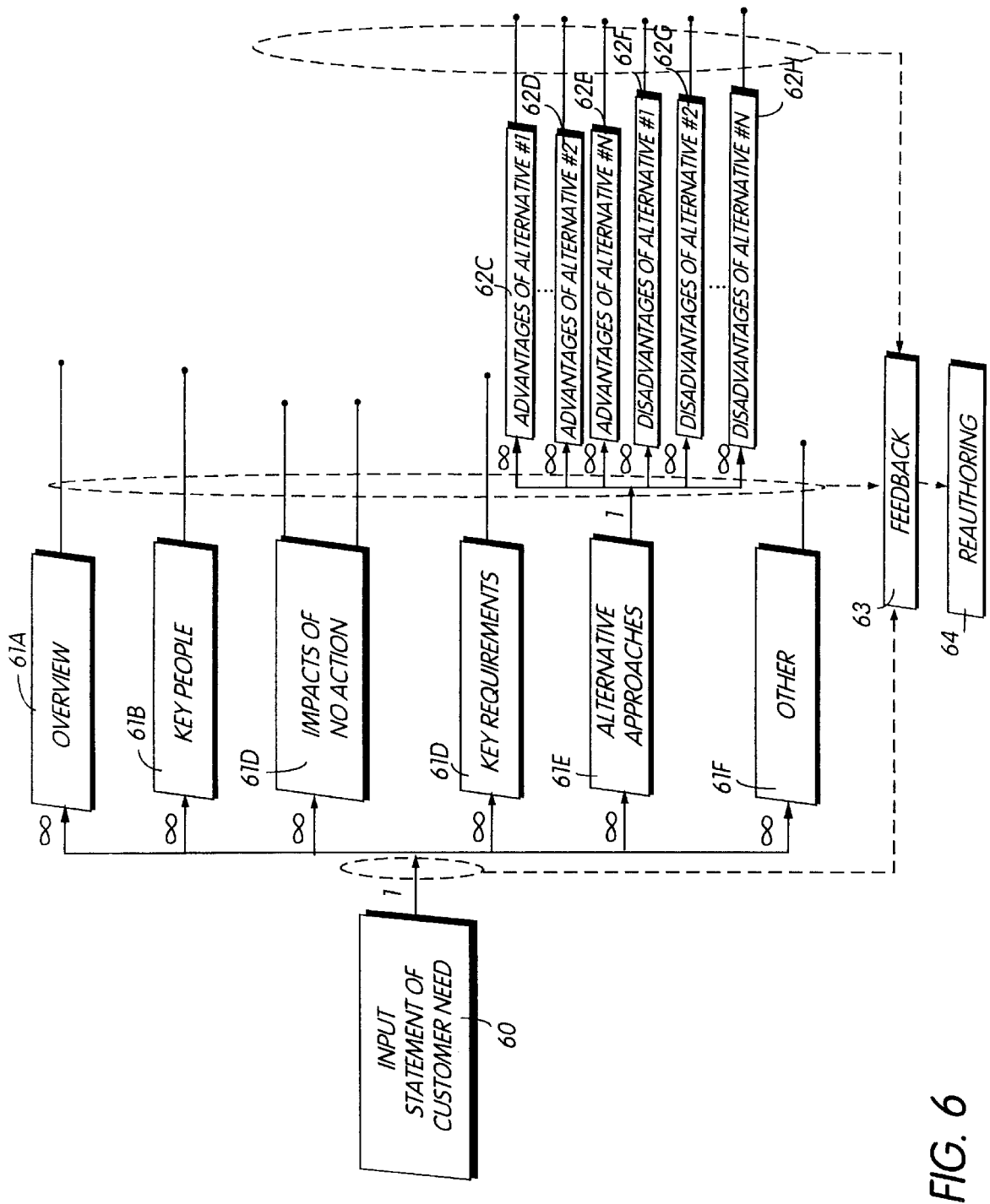
FIGS. 6–11 are flowcharts of example knowledge object retrieval and feedback steps.

FIG. 6 shows the database organization for the Core Subject called "Our Customers Needs." This database organizes customer needs information into a form that is simple for salespeople to use and will navigate them through concise material describing the full impact of a customer's need. In this way, the system assists them giving a fuller understanding of the customer's need and in developing agreement with the customer on the importance of a need before a product is recommended. It also does so without requiring the user to wade through volumes of material, much of which may be irrelevant and contradictory.

FIG. 6 shows an example database used by the present invention to help the user navigate through the Best Answers so they can understand the importance of a customer need. In FIG. 6, the Subject 60 is an identifier of a particular customer need. For every one Subject need, several Topics are available for the users review. Thus, every customer need 60 is identified with an overview 61A of the need, many key people 61B who are responsible for satisfying the need, many impacts of failing to respond to the need 61C, many key requirements 61D of the need, many alternative approaches 61E toward the need, and other topics 61F. From a navigation standpoint, for example, the user who is at any particular attribute will be presented with links 51 to then navigate to learn more about related attributes. Of course, as shown in FIG. 5, just by identifying an attribute, the user also may receive recommended actions 53 and links 51–52 relevant to that attribute that are within a different subject. For example, the links on the need subject 60 can direct the user to choose any of the Topics 61A–61F which pertain to the user's inquiry, or any other Topic, Subject, or Detail attribute that has been linked to that subject by the authors.

Any of the Topics 61A–61F may be also broken down into database into Details 62C–62H. For example, the alternative approaches 61E to a customer need 60 can be further broken down into advantages of the various alternatives 62C–62E and disadvantages of the various alternatives 62F–62H.

All of the information shown in FIG. 6 from the "need" Subject 60 to the Topics 61A–61F to the Details 62A–62H are entered by an author at PCs 11A–11D (FIG. 1) into the database 14. The links between the Subject 60, the Topics 61A–61F and the Details 62A–62H, are created by the system at the time of data entry. Links to other Subjects, Topics, and outside sources are also programmed into the database by an author. When the users accessing the system at the PCs 10A–10D then enter a data request, the request system 18B issues the request from the database 14, and the data display system 18A retrieves the information regarding the data request and displays it on the display 16. The information displayed on the display 16 should include not only the best answer 50 (FIG. 4), but also the next relevant links to be used by the user for navigating deeper into a particular subject inquiry or to link to other Subjects or Topics or information contained outside of the system. Thus, for example, a user who poses an inquiry regarding a particular customer need 60 will be presented information regarding the customer need and also link options to, for example, any of the Topics 61A–61F, to other needs to company products and services, or to competitive products and services, as well as linkages to appropriate Information that is stored outside the system on an Intranet or the Internet for example.

At any point during the course of navigation through the data, the user can provide feedback 63 (FIG. 6) to the authors of the system via the feedback system 18C (FIG. 1). In this manner, engineers, salesmen, executives, staff, and all other employees of an organization who use the present system can provide information regarding the accuracy or acceptability of the responses to the authors of the system. Thus for example, a salesman who hears information in the marketplace regarding an alternative approach to meeting a customer need can input the customer need 60, select the alternative approach as topic 61E, and discover whether information exists on the company database regarding that alternative approach. If the information does not exist, is less complete than the salesperson's knowledge is, or is inaccurate, the salesperson selects a feedback mode 63, which activates the feedback system 18C. The salesperson then enters the feedback information regarding the alternative approach on the keyboard 17. The systems management system 24 (FIG. 2) then identifies a relevant author (for example, an author who is proximate to the salesperson entering the feedback) and delivers that author's computer address to the feedback system 18C. The feedback system 18C then sends the feedback entered on the keyboard 17 by the salesperson to the author identified by the systems management software 24. The feedback then appears on the relevant author's PC 11A–11D, giving the author the information necessary to decide whether the alternative approach topic 61E should be reauthored 64 (FIG. 6) to include the information identified by the salesperson in the feedback step 63.

The feedback is an important part of the present invention and distinguishes the present invention over known expert database systems. With stagnant expert databases, the authors of the system are presumed to be experts in all the areas of the database (or are expected to accurately transcribe the information from someone who is an expert). Unfortunately, in organizations of even a small number of employees, each employee possesses a certain degree of proficiency in particular areas of the organization, but no one employee can be considered the most proficient employee for every area of the corporation's business. Accordingly, in stagnant systems, the answers provided in response to inquiries by the company's employees are rarely, if ever, the best possible answers available in the collective knowledge of the organization. On the other hand, with the present invention, every employee who uses the system has the opportunity to improve the system by critiquing the information in the database. This also includes information from all levels and categories of employees, from entry level staff personnel to the President of the organization. As a result, the initial answers in the database need not be precisely researched and carefully evaluated by all of the skilled employees of the organization before they are entered in the database, because the feedback 63 that will be provided through the natural use of the system will constantly improve the accuracy and scope of the answers over time. As a result, ideally, the Best Answers 50 in the present database will actually be the most valuable answers because over time they become the best answer available within the collective knowledge of the employees of a company.

The present invention is thus unique in that it provides a system directed navigational training tool that provides feedback of information to improve the accuracy and scope of the information given.

FIGS. 7–11 are examples of database design diagrams for other example subjects. In FIG. 7, the Topics and Details for the database subject "our product and service" 70 is shown. For each product and service 70, at least one Description 71A, many product and service strengths 71C, product and service weaknesses 71D, product and service features 71E, and other topics 71F will be linked. In addition, for each strength ("1" through "N") 71C, a strategy 72D–72F is provided. Similarly, the weaknesses 71D have associated strategies 72G–72I and the features 71E have associated benefits 72J–L for each feature ("1" through "N"). As before, after each Subject, Topic, or Detail is displayed, the user has the opportunity to feedback information at step 73 regarding the accuracy or scope of the information provided. This precipitates any necessary re-authoring step 74 by the relevant author.

FIG. 8 diagrams the database for the subject of "our competitors products and services" 80. Here, the Topics relevant to the competitors products or services are the Description 81A, the product or service strengths 81B, the product or service weaknesses 81C, and other Topics 81D. The details for the strengths topic 81B include the present company strategies for each identified strength 82A–82C. Similarly, each weakness 81C has an associated sales strategy 82D–F. Again, feedback 83 and reauthoring 84 are provided for each Subject, Topic, or Detail.

FIGS. 9 through 11 reflect additional optional subject types which may be described by specific organizations.

FIG. 9 shows the database organization for the subject of "our company" 90. Topics associated with the our company subject 90 are general descriptions 91A, mission statements 91B, values 91C, products and service markets 91D, organizational structures 91E, company strengths 91F, and company weaknesses 91G. Details associated with the company markets 91D include company positions in each market 92A–92C. Details for the strengths topic 91F include ways in which the company can leverage its strengths 92D–92F. Details associated with the weaknesses 91G include how the company will address each weakness 91G–91I. Again, feedback 93 and reauthoring 94 are provided following each subject, topic, and detail. FIG. 10 is a database diagram for the subject of "our competitors" 100. For the subject of "our competitors," the associated topics include the competitors' markets 101A, the competitors' strengths 101B, the competitors' weaknesses 101C, and other topics 101D. For the markets topic 101A, associated details include the competitors position in each market 102A–102C. For the strengths and weaknesses topics 101B–101C, strategies associated with each strength and weakness 102D–102I are provided. Again, feedback 103 and reauthoring 104 are also provided.

Finally, FIG. 11 illustrates the database diagram for the Subject of "our processes" 110. This database is designed with only Subject and Topic level organization, without Detail level information. The Topics associated with each of the company processes are the description of the processes 111A, a rationale for the processes 111B, steps associated with the processes 111C, and other topics 111D. Again, feedback 112 and reauthoring 113 steps are provided following the Subjects and Topics.

The invention manages the logical objects through a hierarchy that is exemplified by FIGS. 6–11 and through logical linkages that are set by the authors.

Figure 12:
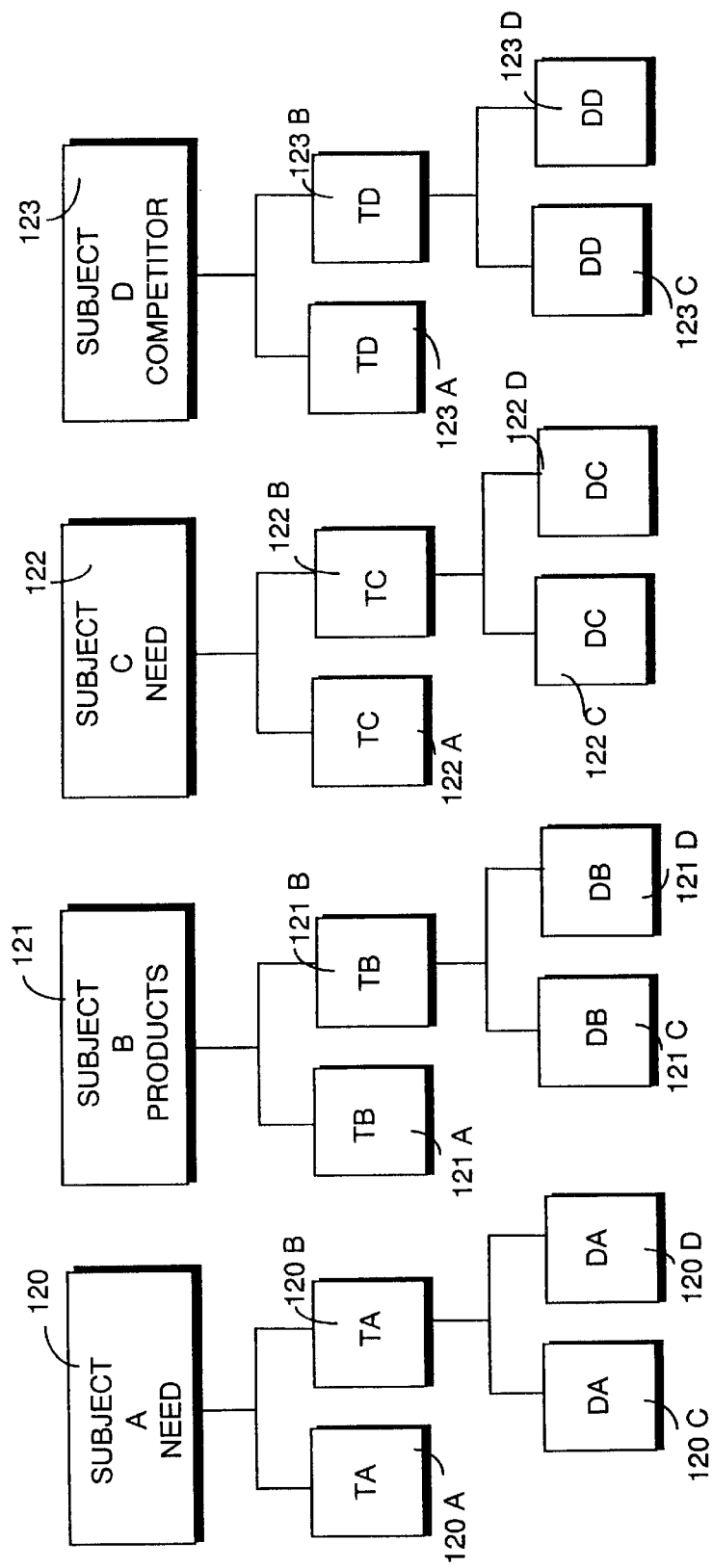
FIG. 12 is a schematic diagram of the objects stored in the data storage of FIG. 2 used by the navigation system of FIG. 2.

FIG. 12 is an example representation of another way to look at the hierarchy of different subjects 120–123. In FIG. 12, four subjects (A–D) are shown, together with hierarchial linkages to either Topics 120A-B, 121A-B, 122A-B, and 123A-B (aka TA–TD).

Also shown are hierarchial linkages to either Details 120C-D, 121C-D, 122C-D, and 123C-D (aka DA–DD).

FIG. 12 is an expert system hierarchy and is created automatically by the system itself.

Figure 13:
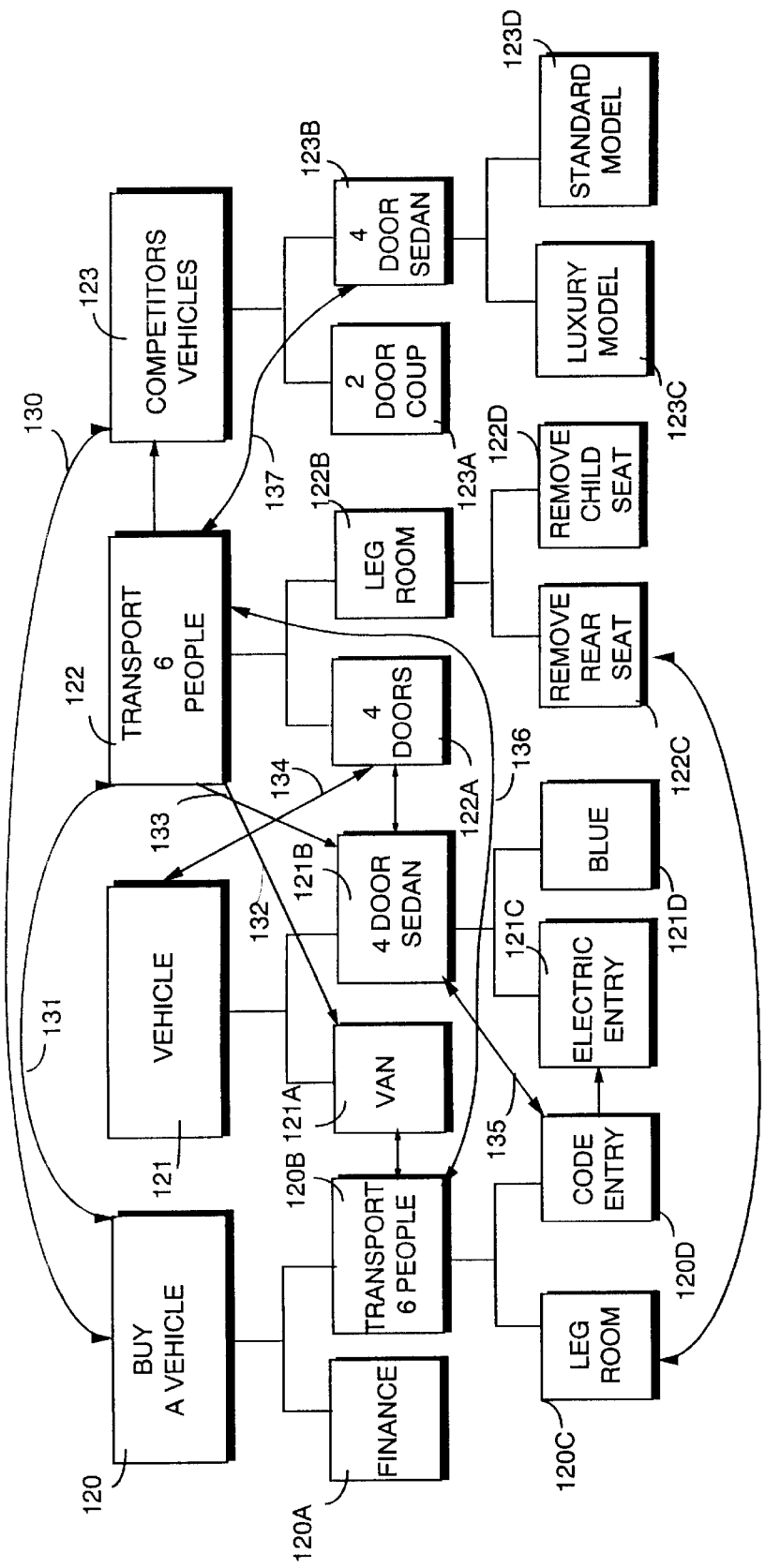
FIG. 13 is a schematic diagram of the objects of FIG. 12 with specific example subjects, details, and topics, together with example linkages.
Figure 14:
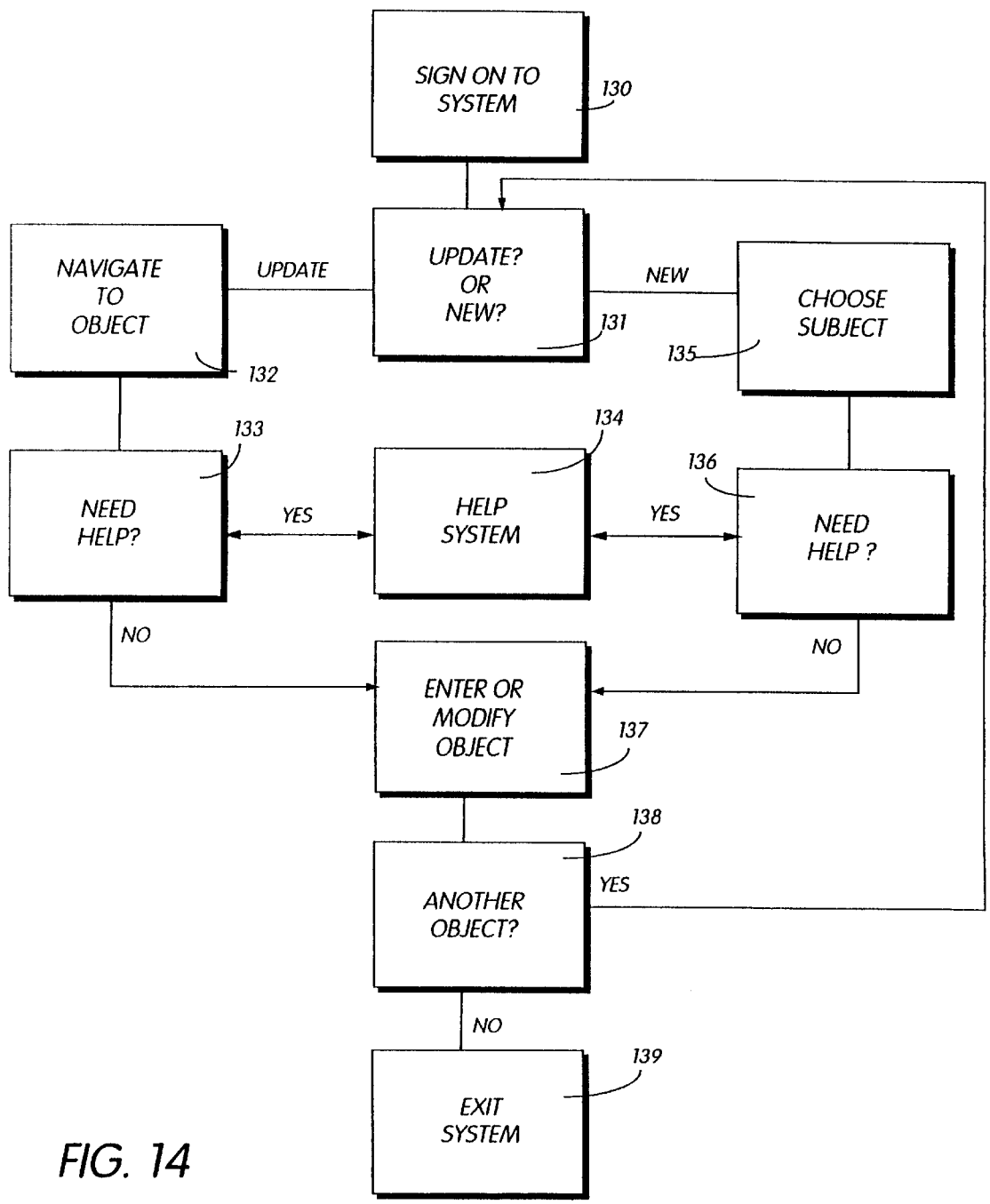
FIG. 14 is a flow diagram of an example authoring process according to the embodiment of FIG. 2.
Figure 15:
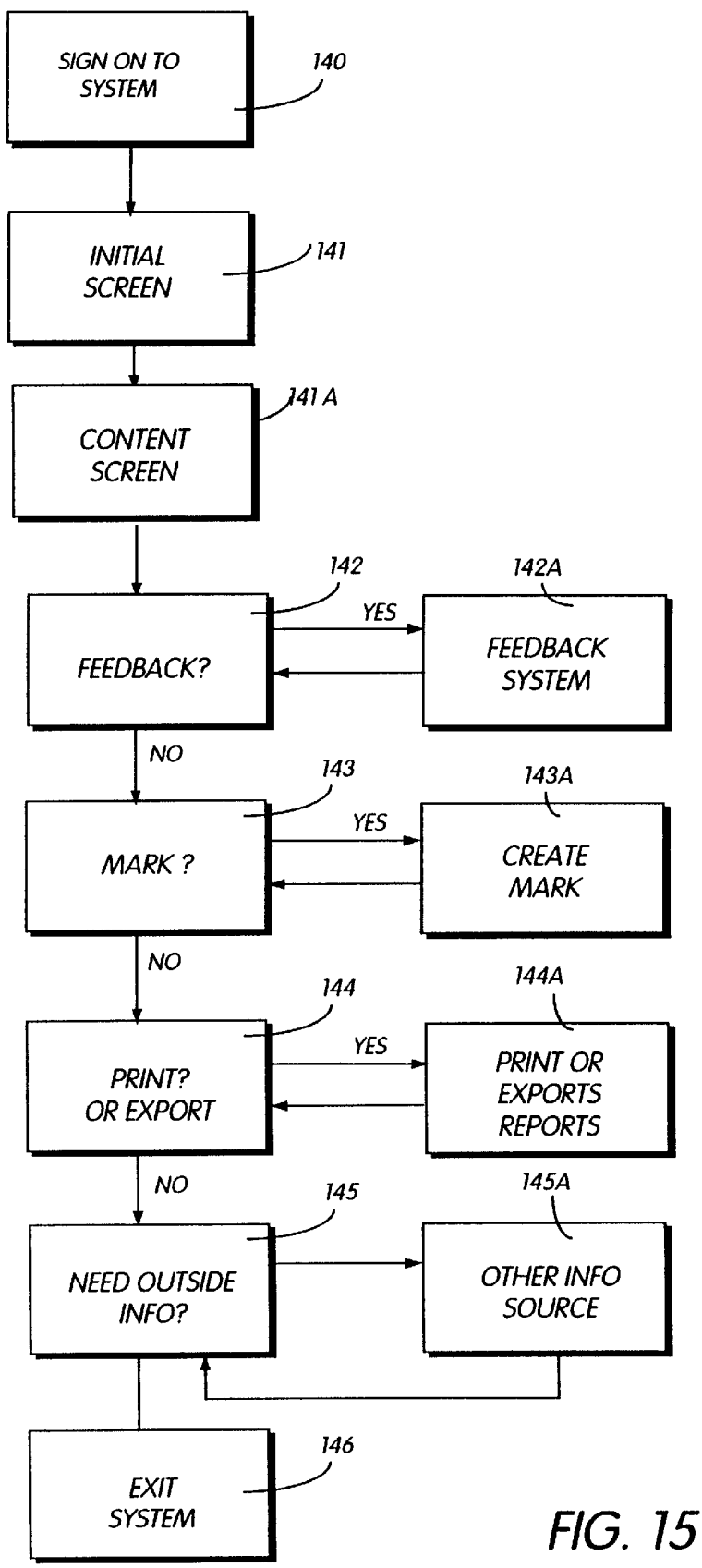
FIG. 15 is a flow diagram of an example User Navigation Process according to the embodiment of FIG. 2.

FIG. 13 is an example of how the expert hierarchy of FIG. 12 can then be improved dramatically by the present authoring process. In FIG. 13 the Subjects, Topics and Details (120A-D through 123A-D) have been filled in by the authoring process to include specific information about an automobile market. The authoring process also provides the customized linkages shown in FIG. 13 by treating the information as Knowledge Objects rather than as a pure hierarchial progression.

FIG. 13 shows two needs: the need to Buy a Vehicle 120, and the need to Transport 6 People 122. One of our products to fit a need is called Vehicle 121 and a competitive product is called Competitor's Vehicles 123. Each subject has many topics, for example, the need To Buy a Vehicle 120 can have a topic which is an alternative approach called Finance 120A and another topic which is a requirement called Transport 6 People 120B which is also a need in itself 122. The requirement to Transport 6 People 120B also has two details: Leg Room 120C and Code Entry 120D. The other subjects have a similar hierarchy. For example our product called Vehicle 121 has two options: Van 121A and 4 Door Sedan 121B. The 4 Door Sedan 121B has electric entry 121C and is available in Blue 121D.

The hierarchial links of FIG. 12 are automatically created by the system during the authoring process, while FIG. 13 represents an example of the logical links that may be set by the authors. The logical links between High Impact Knowledge objects (FIG. 13, for example) come in two forms, similar attribute linkages and dissimilar attribute linkages. Similar attribute linkages may be made between objects within the same subject type, for example, the need to Buy A Vehicle 120 has similar attribute linkages 131 to the need to Transport 6 People 122. Also the detail Leg Room 120C in the Need to Buy a Vehicle 120 has a similar attribute linkage 139 to the detail Removable Rear Seat 122C for the need to Transport 6 People 122. Also the requirement to Transport 6 People 120B in the need to Buy a Vehicle 120 is linked 136 to the subject to Transport 6 People.

Dissimilar attributes linkages may be made when an object in one subject type is linked to another object of a different subject type. An example is the Need to Buy a Vehicle 120 is linked 130 to the Competitors Vehicle 123. The need to Transport 6 People is linked 137 to a feature called 4 Door Sedan 123B of Competitors Vehicle 123. Also the alternative 4 Doors 122A under the need to Transport 6 People 122 is linked 138 to the feature 4 Door Sedan 121B under our product, Vehicle 121, and is also linked directly 134 to Vehicle 121. The same feature, 4 Door Sedan 121B is linked 133 to the need to Transport 6 People 122 and linked 135 to the requirement Code Entry 120D under the need to Buy a Vehicle 120. The need to Transport 6 People 122 is also linked 132 to a feature called Van 121A.

An important component of the invention is that it allows objects to be linked to others regardless of the type of object, for example, a Topic may be linked to a Detail or a Subject.

Of course, as an author builds the linkages, he will do so according to a structure that is logical for the content of the particular Objects that he is linking.

The invention also includes three logical workflow processes controlled by a processor 23, as follows:

The Authoring Process

First, an authoring process 25 allows certain pre-approved users of the system to create and maintain data in the system database. Authoring is done in a format that is encouraged and assisted by the system through an integrated utility described below.

The authoring process 25 is described in FIG. 13. The authoring process begins when a user, who has been authorized as a valid author, signs onto the system at step 130. The author is authenticated and is allowed to proceed at step 131. The author is then asked whether the author wishes to create a new subject or new Level 1, Level 2, or Level 3 knowledge object 31 within an existing Subject or to modify an existing Level 1, Level 2, or Level 3 object.

To create a new high impact knowledge object 31, an author first chooses a subject at step 135, and then navigates through the three hierarchical levels to the appropriate level and object type through a point and click navigation paradigm. Once they are at the appropriate object type, they enter the new data at step 137. If an author chooses to modify an existing Level 1, Level 2, or Level 3 object, they simply start with a subject and navigate to that object at step 132.

Once the author is at the appropriate knowledge object 31, whether the intent is to modify or add, the author may hit a "help key" at step 133 or 136 and receive guidance in how to enter the answer 50 data. The guidance (step 134) includes both linguistic formatting assistance that helps the Author in being as precise and concise as possible and to create answers that clearly convey the specific piece of knowledge. The inventor's research has shown that certain types of best answers require certain format and structure to insure that the knowledge is properly conveyed and retained longer by the user. An example of this formatting is a need statement that the inventor has discovered is best started with the word "To" followed by a verb like Fix or Acquire etc. Also, in the discipline of Salesmanship, there are several companies who have developed selling methodologies that use specific terminology and questioning techniques. A few examples of this are Learning International, Sandler Sales Training Institute, Holden Corporation, Solution Sales, Power Based Selling, Strategic Selling and Zig Ziglar. The assistance to authors will include these methodologies and questioning techniques as examples. An important component of each answer 50 is that it be as brief and specific as possible (preferably one sentence) so that it is easily understood and retained by the user.

The authoring system assists the author in adding information to a Knowledge Object 31 (FIG. 4). When an author enters on Answer 50, the authoring system may prompt the author for:

1. Recommended actions for users 53;
2. Linkages to other knowledge objects 51; and
3. Links and Pointers to information outside of the system 52.

With this information, the authoring system builds a Knowledge Object 31 (FIG. 4) in the database with links to the items of information entered as described above. When the author has completed the work on an object, they may exit the authoring process at step 139 or continue work on a different knowledge object 31 at step 138.

User Navigation

A user navigation process 26 allows certain pre-approved users to browse through data that was created through the Authoring process 25 for training indexing and linking purposes and to provide feedback on that data as well as submit additional data for review and inclusion by the authors.

Users of the system can navigate the High Impact Knowledge Objects 31 in an unrestricted and ad hoc fashion, depending on the information they are seeking, or the questions that they have. To operate the training and feedback session, a user first signs onto the system at step 140 and is authenticated. At step 141, the user is then presented with an initial screen which allows them to start their navigation and search in one of at least four ways:

1. By Subject
2. By Key Person (Level 2 on FIG. 6)
3. By Linguistic Search Techniques
4. Others Based upon the initial search, the system presents the user with a Content Screen 141A containing the appropriate Best Answers 50 along with several indicators which reflect that specific answer's position in the logical data model. These indicators assist in "framing the answer" for the user and letting them visualize other navigation possibilities. The screen also contains pointers to other Objects 31 that are logically associated with the Answer 50 that is displayed, as well as several function buttons that allow the user to freely navigate throughout the system. The user can also access information that is contained in other systems that has been specifically linked to this Knowledge Object 31 through the authoring process 25. Each time an Answer 50 is displayed, the appropriate pointers and function buttons are displayed as well, giving the user ultimate control of the navigation process.

Figure 17:
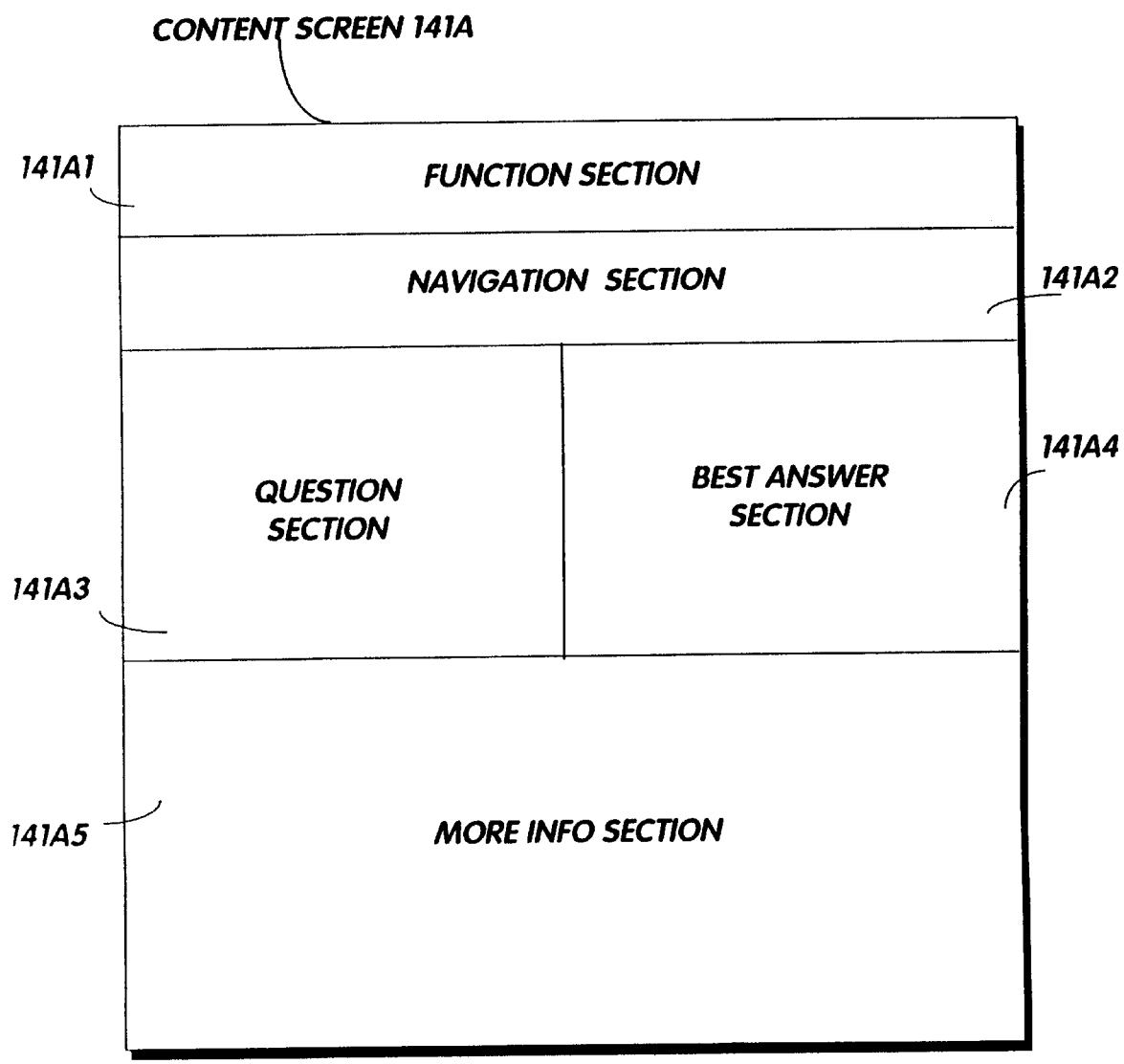
FIG. 17 is a logical layout of the content screen used in the User Navigation Process.

The Content Screen 141A is further detailed in FIG. 17. The object oriented design of the invention allows the screen to be dynamically configured by the user with one click of a pointing device. The Content Screen 141A has five sections as follows: a Function Section 141A1, a Navigation Section 141A2, a Question Section 141A3, a Best Answers Section 141A4, and a More Info Section 141A5.

The Function Section 141A1 contains icons for the key functions of Feedback 142, Marking 143, and Printing and Exporting 144. Other functions are also anticipated.

The Navigation Section 141A2 contains a record of navigation that has been done previously in this session so the user can see the path they took to get to this specific Content Screen 141A. It also shows the specific Level 1 Subject Identifier 40 for the rest of the information shown on the screen.

The Question Section 141A3 shows many Level 3 Topic Attributes 40 (Questions) for the Subject displayed in the Navigation Section 141A2.

The Best Answers Section 141A4 contains many Best Answers 50 for each Question in the Question Section 141A3. The Best Answers 50 are dynamically configured and displayed when a user clicks on a specific Question.

The More Info Section 141A5 contains Level 3 Detail Attributes 40, Recommended Actions 53, Links to Other High Impact Objects 51, and Links & Pointers to Information Outside the System 52. The More Info Section is dynamically configured and displayed when a user clicks on a specific Best Answer 50.

The Content Screen 141A allows the user to fully control the progression through the information, while maintaining sufficient hierarchial structure to coach the user through the information. This feature is accomplished by the present invention as result of its organization into High Impact Knowledge Objects, as described previously.

The recommended actions for users 53 that may be included in each Knowledge Object 31 are also navigational tools since they provide additional system actions available to the user. These actions 53 can be immediately accessed through a pointing device. Once a user has any portion of a Knowledge Object 31 displayed on the screen, there are at least four key functions, beyond further navigation, within the system, ending the session, and exiting the system, that are available to the user:

1. Give feedback (step 142)
2. Mark that portion of the object for future reference (step 143)
3. Print/Export that portion of the object (step 144)
4. Access information outside of the invention through the Pointers 52 (step 145).

The feedback facility at step 142a within the user navigation process can operate through a variety of communication mechanisms (for example, Integrated E-MAIL or other messaging techniques). When a user enters comments and feedback, such as evaluations on the effectiveness of certain Knowledge Objects 31 and new information regarding any subject, the system captures the feedback and populates the database 32 with the feedback along with some supportive information such as date and user, etc.

A marking utility at step 143a allows the user to place a temporary book mark on any particular portion of a knowledge object 31 that they may want to refer to in the future, either for quick navigation, or for printing or exporting the data.

The Print/Export function at step 144a allows the user to either print the data that they want to take with them or export that data into another application. An example of exporting would be the transfer of recommended actions data to the sales person's contact management software.

The invention also supports integration with other systems that are available on the organizations network, other networks, and locations back within and without the organization through the pointers and links to outside information 53 contained in each Knowledge Object 31. To receive outside information at step 145 and 145a, the user selects the outside source destination from a pick list contained in 141A5 and the system automatically transfers the user to the destination through either the network server 12 or the Internet server 15. While at the outside location, the invention continues to operate in the background so the user can return to the original knowledge object. Following the navigation through whatever information is desired, the user exits the system at step 146.

Systems Management

Figure 16:
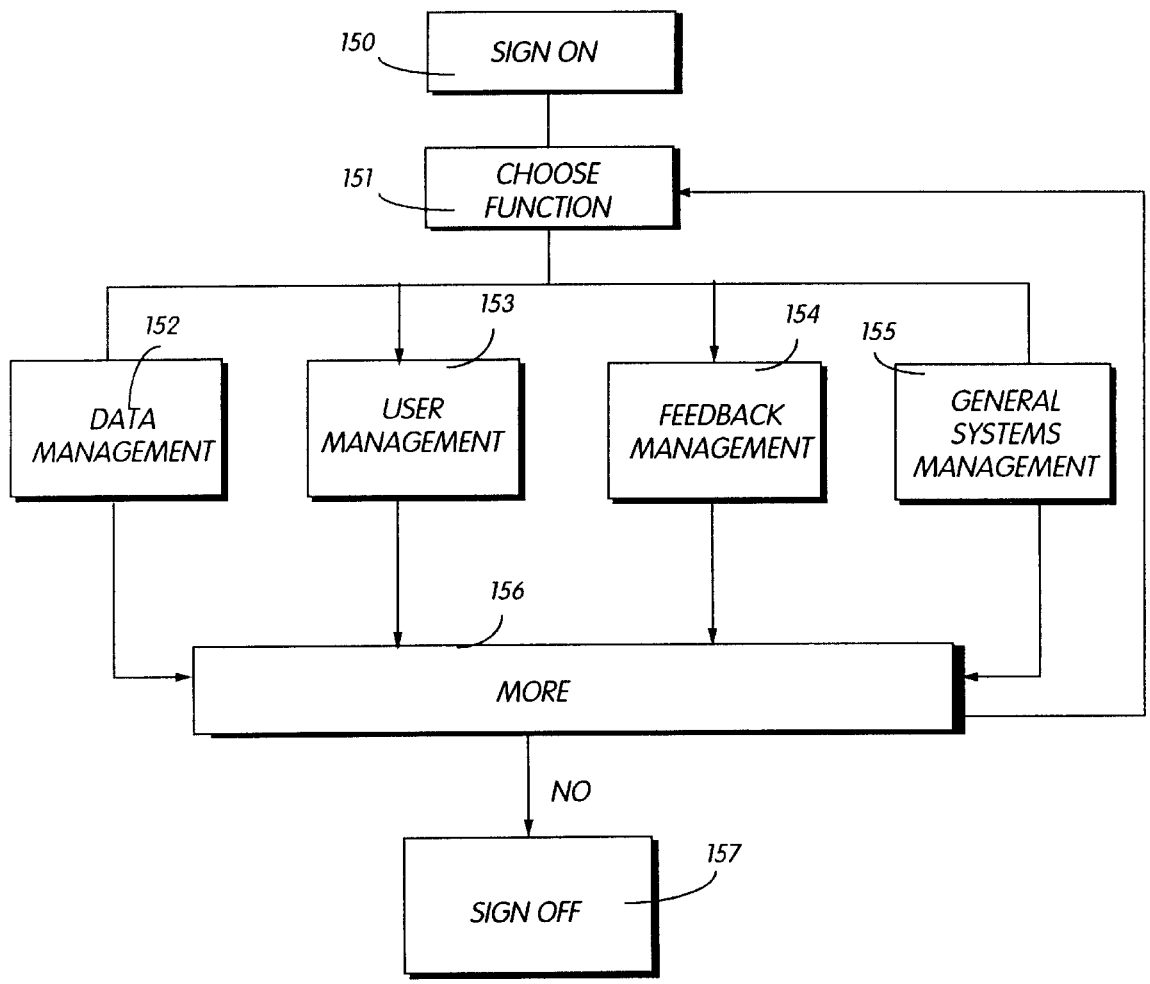
FIG. 16 is a flow diagram of an example System Management Process according to the embodiment of FIG. 2.

A system management process 24, shown in FIG. 16, allows certain pre-approved users to configure the system, manage the feedback and perform other functions necessary to keep the system running and available to other users.

The Systems Management Process allows any number of pre-approved systems administrators to perform tasks that insure the systems availability and performance as well as tasks that improve the quality of the information that is stored in the systems data storage 22. The system administrator signs on to the system at step 150 and is authenticated. Once authentication is satisfied the systems administrator can perform several major functions at step 151, as follows:

1. Data management (step 152) includes entering and deleting subjects 41 and assigning access rules for knowledge objects 31.
2. User management (step 153) includes setting and maintaining user profile information and security levels for the authentication process.
3. Feedback Management (step 154) includes reporting on feedback patterns, distributing certain feedback to specific authors, and insuring timely response to feedback.
4. General systems management (step 155) includes setting replication schedules, reorganizing the data base, performing upgrades to the system and other functions.

Additional system management edits can be chosen at step 156. At the conclusion of a system management session, system manager sign off at step 157.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An information indexing apparatus for an organization of employees, the organization having competitors, the organization and competitors providing responses to customer needs, comprising:

a memory for storing a database including:

a needs table of information identifying a plurality of the customer needs, together with needs pointers and links to secondary information associated with the customer needs, at least some of said secondary information being external to said organization, each identified customer need having a one-to-many relationship with the needs pointers and links, an organization table of information identifying a plurality of the organization provisions responding to the identified plurality of customer needs, together with provisions pointers and links to secondary information associated with the organization provisions, each identified organization provision having a one-to-many relationship with the provisions pointers and links and a competitor table of information identifying a plurality of competitor provisions responding to the identified plurality of customer needs, together with competitor pointers and links to secondary information associated with the competitor provisions, each identified competitor provision having a one-to-many relationship with the competitor pointers and links; and an input system having:

an authoring process for accessing, creating and modifying the database, a user process for accessing the database by the employees, and a feedback process to communicate feedback from the user process to the authoring process regarding the accuracy of the tables in the database, whereby, over time, the feedback process will accumulate ever improved information available to the organization in the collective knowledge of the employees.

2. An apparatus as in claim 1, wherein the secondary information associated with the customer needs includes:

information describing the need;

information identifying people associated with the need;

information identifying impacts of not responding to the need; and information identifying alternative responses to the need.

3. An apparatus as in claim 2, wherein at least one of the identified alternative responses includes alternatives pointers and links to tertiary information associated with the alternative responses, the identified alternative response having a one-to-many relationship with the alternatives pointers and links.

4. An apparatus as in claim 3, wherein the tertiary information associated with the identified alternative response includes:

information identifying advantages of the alternative; and information identifying disadvantages of the alternative.

5. An apparatus as in claim 1, wherein the secondary information associated with the organization provisions includes:

information identifying features of the organization provisions;

information identifying strengths of the organization provisions; and information identifying weaknesses of the organization provisions.

6. An apparatus as in claim 1, wherein the secondary information associated with the competitor provisions includes:

information identifying features of the competitor provisions;

information identifying strengths of the competitor provisions; and information identifying weaknesses of the competitor provisions.

7. An apparatus according to claim 1, wherein the tables of information contain said customer needs, organization provisions and competitor provisions as High Impact Knowledge Objects.

8. An information indexing apparatus for an organization of employees, the organization having competitors, the organization and competitors providing responses to customer needs, comprising:

a memory for storing a database including:

a needs table of information identifying a plurality of the customer needs, together with needs pointers and links to secondary information associated with the customer needs, at least some of said secondary information being external to the organization, each identified customer need having a one-to-many relationship with the needs pointers and links, an organization table of information identifying a plurality of the organization provisions responding to the identified plurality of customer needs, together with provisions pointers and links to secondary information associated with the organization provisions, each identified organization provision having a one-to-many relationship with the provisions pointers and links, and a competitor table of information identifying a plurality of competitor provisions responding to the identified plurality of customer needs, together with competitor pointers and links to secondary information associated with the competitor provisions, each identified competitor provision having a one-to-many relationship with the competitor pointers and links;

an authoring system for accessing, creating and modifying the database;

a plurality of user systems in communication With the authoring system for accessing the database by the employees; and a feedback system to communicate feedback from the user systems to the authoring system regarding the accuracy of the tables in the database, whereby, over time, the feedback process will accumulate ever improved information available to the organization in the collective knowledge of the employees.

9. An apparatus as in claim 8, wherein the secondary information associated with the customer needs includes:

information describing the need;

information identifying people associated with the need;

information identifying impacts of not responding to the need; and information identifying alternative responses to the need.

10. An apparatus as in claim 9, wherein at least one of the identified alternative responses includes alternatives pointers to tertiary information associated with the alternative responses, each identified alternative response having a one-to-many relationship with the alternatives pointers.

11. An apparatus as in claim 10, wherein the tertiary information associated with the identified alternative response includes:
    information identifying advantages of the alternative; and
    information identifying disadvantages of the alternative.

12. An apparatus as in claim 8, wherein the secondary information associated with the organization provisions includes:
    information identifying features of the organization provisions;
    information identifying strengths of the organization provisions; and
    information identifying weaknesses of the organization provisions.

13. An apparatus as in claim 8, wherein the secondary information associated with the competitor provisions includes:
    information identifying features of the competitor provisions;
    information identifying strengths of the competitor provisions; and
    information identifying weaknesses of the competitor provisions.

14. An apparatus according to claim 8, wherein the tables of information contain said customer needs, organization provisions and competitor provisions as High Impact Knowledge Objects.

15. A system for organizing data files for a sales organization of a company including users and authors, comprising:
    data storage including a database of inquiries and corresponding answers, including
        information regarding a customers need with links to locations in networks within and without the database containing information regarding:
            an impact to the customer of not meeting the need, and
            an alternative approach to the need,
        information regarding a company solution to the sales need with links to separate locations in the database containing information regarding:
            a sales strategy for selling the company solution,
            a feature of the company solution, and
        information regarding a competitive solution to the customer need with links to separate locations in the database containing information regarding:
            description of the competitive solution, and
            a feature of the competitive solution, and
    an indexer to retrieve an answer when presented with a corresponding inquiry;
    a user terminal for the users of the sales organization to receive an answer to an inquiry, to display an answer and to input said inquiries;
    an author terminal for the authors to modify said corresponding answers to said inquiries, and
    a feedback system for said users to communicate from said user terminal to said author terminal changes to said corresponding answers, whereby, over time, the feedback system will accumulate ever improved corresponding answers available to the organization in the collective knowledge of the users.

16. An apparatus according to claim 1, further including:
    a network server to access information outside of said memory, said user proves also for accessing said outside information through said server.

17. An apparatus according to claim 8, further including:
    a network server to access information outside of said memory, said user proves also for accessing said outside information through said server.

* * * * *